US010207749B2

(12) United States Patent
Krijnen et al.

(10) Patent No.: US 10,207,749 B2
(45) Date of Patent: Feb. 19, 2019

(54) POLYMERIC ENGINE HOOD ASSEMBLY, VEHICLE FRONT END MODULE, VEHICLES COMPRISING THE SAME AND METHODS OF MAKING THE SAME

(71) Applicant: Sabic Global Technologies B.V., Bergen op Zoom (NL)

(72) Inventors: Jeroen Krijnen, Bergen op Zoom (NL); Geert Jan Schellekens, Bergen op Zoom (NL); Claire Marie-Annick Martin, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/536,429

(22) PCT Filed: Dec. 16, 2015

(86) PCT No.: PCT/IB2015/059691
§ 371 (c)(1),
(2) Date: Jun. 15, 2017

(87) PCT Pub. No.: WO2016/098024
PCT Pub. Date: Jun. 23, 2016

(65) Prior Publication Data
US 2018/0001937 A1 Jan. 4, 2018

Related U.S. Application Data

(60) Provisional application No. 62/092,619, filed on Dec. 16, 2014.

(51) Int. Cl.
*B62D 25/10* (2006.01)
*B62D 29/04* (2006.01)
(Continued)

(52) U.S. Cl.
CPC .......... *B62D 29/043* (2013.01); *B62D 25/10* (2013.01); *B62D 25/12* (2013.01); *B29C 51/082* (2013.01);
(Continued)

(58) Field of Classification Search
CPC .......................................... B62D 25/10–25/12
See application file for complete search history.

(56) References Cited

U.S. PATENT DOCUMENTS 6,883,627 B1 * 4/2005 Staines ................... B60R 21/34
180/69.2
7,240,753 B2 7/2007 Ellerman
(Continued)

FOREIGN PATENT DOCUMENTS

| CN | 201816651 U | 5/2011 |
|----|-------------|--------|
| CN | 102642562 A | 8/2012 |

(Continued)

OTHER PUBLICATIONS

International Search Report. International Application No. PCT/IB2015/059691; International Filing Date: Dec. 16, 2015; dated Apr. 12, 2016; 5 pages.
(Continued)

*Primary Examiner* — Erez Gurari
(74) *Attorney, Agent, or Firm* — Cantor Colburn LLP

(57) ABSTRACT

A method of making a polymeric engine hood assembly for use in a vehicle can include applying heat to a first polymeric sheet, applying heat to a second polymeric sheet, stacking the first polymeric sheet and the second polymeric sheet, placing the stacked sheets between a first mold half and a second mold half, closing the first mold half and second mold half, applying vacuum to the space between the first polymeric sheet and the first mold half and between the second polymeric sheet and the second mold half, wherein
(Continued)

the first polymeric sheet forms an exterior panel and wherein the second polymeric sheet forms a reinforcing structure; and attaching an exterior panel to a fender skin at a junction surface, wherein the reinforcing structure includes a connecting ridge extending transversely across the reinforcing structure, wherein the connecting ridge is configured to accept the junction surface of the exterior panel and the feeder skin.

20 Claims, 11 Drawing Sheets

(51) Int. Cl.
  *B62D 25/12* (2006.01)
  *B29C 51/08* (2006.01)
  *B29K 101/12* (2006.01)
  *B29L 31/30* (2006.01)

(52) U.S. Cl.
  CPC ... *B29K 2101/12* (2013.01); *B29L 2031/3005* (2013.01); *B60Y 2306/09* (2013.01); *B60Y 2410/122* (2013.01)

(56) References Cited

U.S. PATENT DOCUMENTS

| | | | |
|---|---|---|---|
| 7,341,298 | B2 | 3/2008 | Jones |
| 7,556,309 | B2 | 7/2009 | Ayabe |
| 7,789,179 | B2* | 9/2010 | Steiner ............... B29C 43/021 180/69.2 |
| 2002/0053811 | A1 | 5/2002 | Meyers |
| 2005/0184560 | A1* | 8/2005 | Yiu ..................... B62D 25/105 296/204 |
| 2006/0163915 | A1* | 7/2006 | Ikeda .................. B60R 21/34 296/193.11 |
| 2010/0048122 | A1* | 2/2010 | Uto ..................... B60J 5/0487 454/195 |
| 2010/0314907 | A1* | 12/2010 | Iwano ................. B62D 25/105 296/187.09 |
| 2014/0015285 | A1* | 1/2014 | Ishitobi ............... B62D 25/105 296/193.11 |
| 2015/0028624 | A1* | 1/2015 | Wisniewski ........ B62D 25/105 296/187.03 |
| 2015/0054305 | A1* | 2/2015 | Steinhilb ............ B62D 25/105 296/187.04 |
| 2015/0069786 | A1* | 3/2015 | Benson .............. B62D 25/105 296/187.09 |
| 2015/0307135 | A1* | 10/2015 | Lindmark ........... B62D 25/12 296/191 |
| 2015/0329147 | A1* | 11/2015 | Iwano ................. B62D 25/105 296/193.11 |
| 2015/0360728 | A1* | 12/2015 | Hammer ............. B62D 25/105 296/187.13 |
| 2015/0360729 | A1* | 12/2015 | Chikada ............. B62D 25/105 296/187.09 |
| 2016/0083019 | A1* | 3/2016 | Takada ............... B60R 21/34 296/193.11 |
| 2016/0096505 | A1* | 4/2016 | Ikeda ................. B60R 21/34 296/193.11 |
| 2016/0107606 | A1* | 4/2016 | Mildner ............. B60R 21/34 296/193.11 |
| 2016/0144898 | A1* | 5/2016 | Fujii .................. B60J 5/045 296/191 |
| 2016/0152283 | A1* | 6/2016 | Guha ................. B29C 65/48 428/213 |
| 2016/0251033 | A1* | 9/2016 | Kolar, Jr. ........... B60R 21/34 296/193.11 |
| 2016/0280277 | A1* | 9/2016 | Shastry .............. B62D 25/105 |
| 2016/0280279 | A1* | 9/2016 | Yoshida ............. B62D 25/12 |
| 2017/0232925 | A1* | 8/2017 | Barbat ............... B60R 21/36 280/735 |
| 2017/0274937 | A1* | 9/2017 | Hammer ............ B62D 25/082 |
| 2017/0282977 | A1* | 10/2017 | Kashima ............ B62D 25/12 |
| 2017/0335610 | A1* | 11/2017 | Hall .................. E05D 3/06 |
| 2018/0001937 | A1* | 1/2018 | Krijnen ............. B62D 29/043 |
| 2018/0015959 | A1* | 1/2018 | Metcalf ............. B62D 25/105 |

FOREIGN PATENT DOCUMENTS

| | | |
|---|---|---|
| CN | 203332227 U | 12/2013 |
| EP | 1867560 A1 | 12/2005 |
| JP | 07040860 A | 2/1995 |
| JP | 2007261459 A | 10/2007 |
| JP | 2014201286 A | 10/2014 |

OTHER PUBLICATIONS

Japanese Patent No. H0740860; Date of Publication: Feb. 10, 1995; Abstract Only, 2 pages.
Written Opinion of the International Searching Authority; International Application No. PCT/IB2015/059691; International Filing Date: Dec. 12, 2015; dated Apr. 12, 2016; 12 pages.
International Preliminary Examining Authority, International Application No. PCT/IB2015/059691;dated Nov. 28, 2016; 87 pages.
Chinese Patent No. 102642562; Date of Publication: Aug. 22, 2012; Abstract Only, 1 page.
Chinese Patent No. 201816651; Date of Publication: May 4, 2011; Abstract Only, 2 pages.
Chinese Patent No. 203332227; Date of Publication: Dec. 11, 2013; Abstract Only, 1 page.
Japanese Patent No. 2007261459; Date of Publication: Oct. 11, 2007; Abstract Only, 1 page.
Japanese Patent No. 2014201286; Date of Publication: Oct. 27, 2014; Abstract Only, 1 page.

* cited by examiner

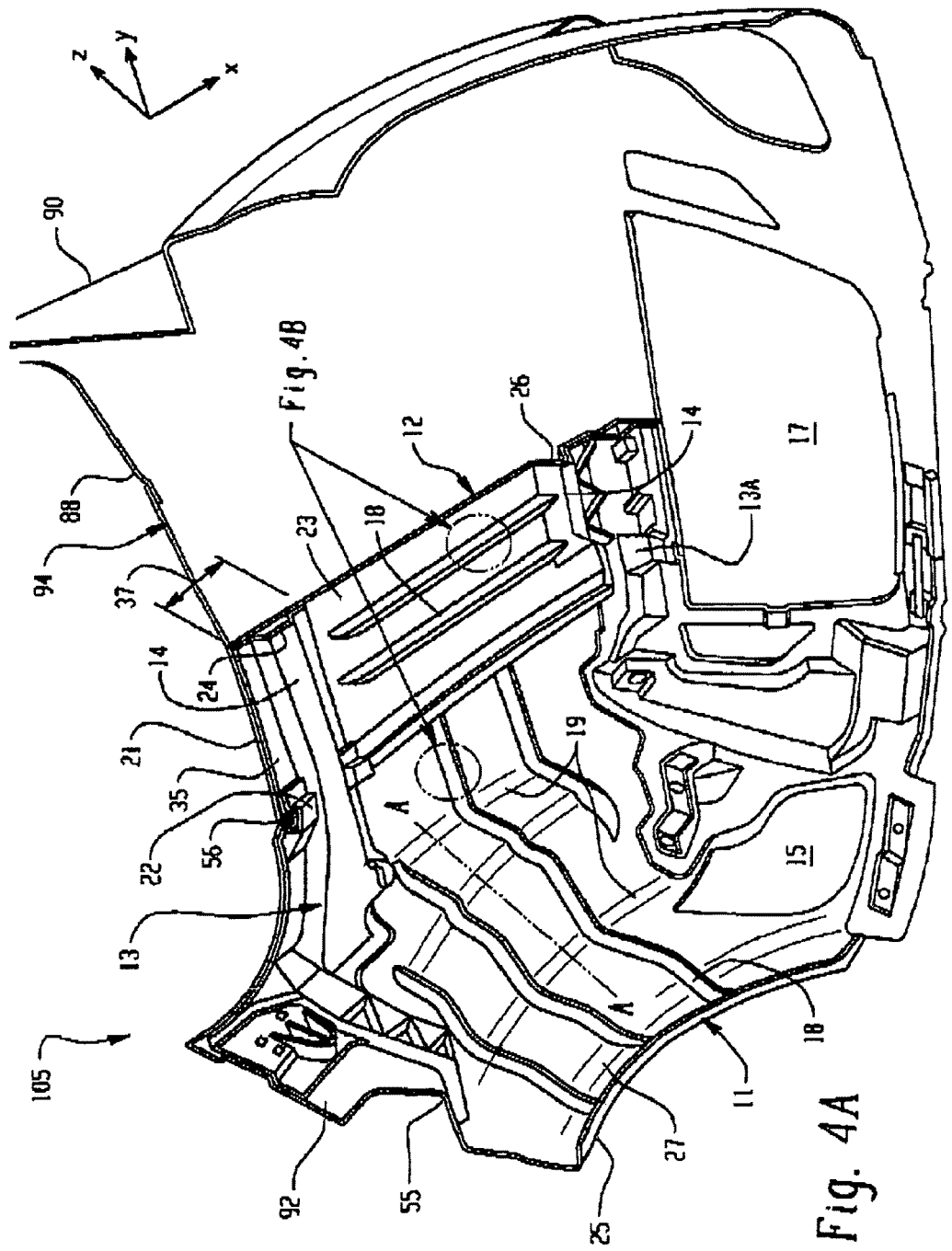

POLYMERIC ENGINE HOOD ASSEMBLY, VEHICLE FRONT END MODULE, VEHICLES COMPRISING THE SAME AND METHODS OF MAKING THE SAME

CROSS REFERENCE TO RELATED APPLICATIONS

This application is a 371 of International Application No. PCT/M2015/059691, filed Dec. 16, 2015, which claims priority to U.S. Application No. 62/092,619, filed Dec. 16, 2014, both of which are incorporated herein by reference in their entirety.

BACKGROUND

Vehicle original equipment manufacturers and fleet owners are continually looking for solutions to reduce cost by reducing the number of parts, reducing the overall weight, and reducing the number of production steps to produce the vehicle. Vehicle original equipment manufacturers are also looking for solutions to improve vehicle mileage and emissions, Regulations are currently being drafted worldwide that will enforce the further reduction of vehicle emissions, Thermoset and fiberglass reinforced plastic materials are currently used, but these materials are limited in their forming operations. Therefore, solutions which can improve vehicle mileage and reduce vehicle emissions are continually desired.

BRIEF DESCRIPTION

A polymeric engine hood assembly for use in a vehicle, includes: an exterior panel having an exterior panel engine facing surface and an exterior panel outermost surface, wherein the exterior panel extends in an x direction; a fender skin adjacent to a portion of the exterior panel engine facing surface at a junction surface, wherein the fender skin has a fender skin engine facing surface and a fender skin outermost surface, wherein a portion of the fender skin extends in the x direction and wherein a portion of the fender skin extends in a y direction; and a reinforcing structure including a body comprising a reinforcing structure first surface and a reinforcing structure second surface, wherein the reinforcing structure includes alternating ridges and flanges extending along the reinforcing structure in the y direction forming corrugations, wherein the corrugations extend at least partially transversely across the body of the reinforcing structure or a reinforcing member including a body comprising a reinforcing member first surface and a reinforcing member second surface, wherein the reinforcing member includes alternating ridges and grooves extending across the reinforcing member in the y direction forming corrugations, wherein the corrugations extend at least partially longitudinally along the body of the reinforcing member; wherein indentations are disposed in the corrugation flanges on the reinforcing structure and wherein the reinforcing structure is adjacent to and extends along a portion of an exterior panel engine facing surface and along a portion of a fender skin engine facing surface; wherein the reinforcing structure includes a connecting ridge extending transversely across the reinforcing structure located between indentations, wherein the connecting ridge is configured to accept the junction surface of the exterior panel and the fender skin; wherein channels are formed in air cavities located between the ridges on the reinforcing structure and the engine facing surfaces of the exterior panel and the fender skin.

A method of making a polymeric engine hood assembly for use in a vehicle, includes: applying heat to a first polymeric sheet; applying heat to a second polymeric sheet; stacking the first polymeric sheet and the second polymeric sheet; placing the stacked sheets between a first mold half and a second mold half; closing the first mold half and a second mold half; applying vacuum to the space between the first polymeric sheet and the first mold half and between the second polymeric sheet and the second mold half, wherein the first polymeric sheet forms an exterior panel and wherein the second polymeric sheet forms a reinforcing structure including a body comprising a reinforcing structure first surface and a reinforcing structure second surface, wherein the reinforcing structure includes alternating ridges and flanges extending across the reinforcing structure in the y direction forming corrugations, wherein the corrugations extend at least partially transversely across the body of the reinforcing structure, wherein indentations are disposed in the corrugations on the reinforcing structure; and attaching the exterior panel to a fender skin at a junction surface, wherein the reinforcing structure includes a connecting ridge extending transversely across the reinforcing structure located between indentations, wherein the connecting ridge is configured to accept the junction surface of the exterior panel and the fender skin, wherein the reinforcing structure is adjacent to and extends along a portion of an exterior panel engine facing surface and along a portion of a fender skin engine facing surface.

A polymeric engine hood assembly for use in a vehicle, includes: an exterior panel having an exterior panel engine facing surface and an exterior panel outermost surface, wherein the exterior panel extends in an x direction; a fender skin adjacent to a portion of the exterior panel engine facing surface at a junction surface, wherein the fender skin has a fender skin engine facing surface and a fender skin outermost surface, wherein a portion of the fender skin extends in the x direction and wherein a portion of the fender skin extends in a y direction; and a reinforcing structure including a body comprising a reinforcing structure first surface and a reinforcing structure second surface, wherein the reinforcing structure attaches to and extends along a portion of an exterior panel engine facing surface and along a portion of a fender skin engine facing surface, wherein the reinforcing structure includes a ridge and flange extending transversely in the y direction forming a corrugation; wherein ribs are disposed laterally across a portion of the exterior panel engine facing surface and wherein ribs are disposed longitudinally across a portion of the fender skin engine facing surface; wherein the reinforcing structure includes a connecting ridge extending transversely across the reinforcing structure located between ribs, wherein the connecting ridge is configured to accept the junction surface of the exterior panel and the fender skin; wherein a channel is formed in air cavities located between the ridge on the reinforcing structure and the engine facing surfaces of the exterior panel or the fender skin.

The above described and other features re exemplified the fallowing figures and detailed description.

BRIEF DESCRIPTION OF THE DRAWINGS

Refer now to the figures, which are exemplary embodiments, and wherein the life elements are numbered alike.

FIG. 4A is an engine facing view of another polymeric engine hood assembly.

DETAILED DESCRIPTION

Figure 1:
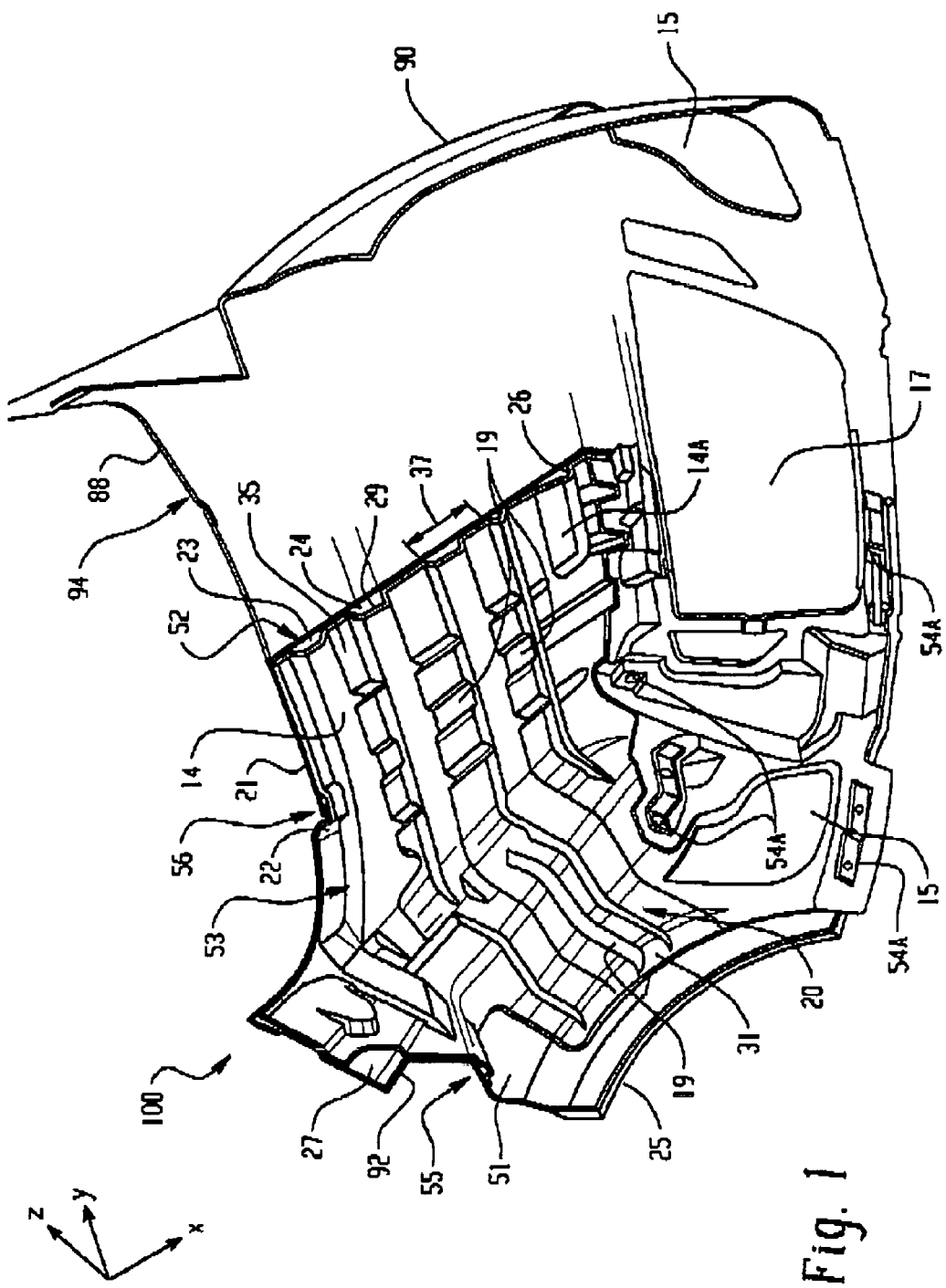
FIG. 1 is an engine facing view of a polymeric engine hood assembly.

It can be difficult to manufacture thermoplastic engine hood assemblies for use in a vehicle, since thermal requirements for the vehicle engine hood assemblies can mean the use of materials able to withstand exposure to high temperatures (e.g., temperatures greater than or equal to 160° C.) without failing (e.g., cracking, peeling, buckling, etc.), which can be more expensive than other materials (e.g., thermoset materials) used to make vehicle engine hood assemblies. However, the use of thermoplastics in manufacturing vehicle engine hood assemblies can present advantages such as allowing for faster fabrication of the vehicle engine hood assembly by removing the need for secondary operations after forming such as painting, sanding, etc. Thermoplastic materials in vehicle engine hood assemblies can give an overall aesthetically pleasing and acceptable appearance to the formed vehicle engine hood assembly without secondary operations. Additionally, the use of thermoplastic materials can be more environmentally friendly than using, for example, thermoset materials, since thermoplastic materials have the ability to be recycled.

Polymeric engine hood assemblies for use in a vehicle, for example, a truck, can include an exterior panel and a fender skin where the exterior panel and fender skin can be located adjacent to a reinforcing structure or a reinforcing member. The fender skin can include two lower fenders and two upper fenders connected by a hood panel. The polymeric engine hood assemblies can assist in facilitating attachment of headlights, hinges, lift-assist components, bump stops, hood supports, air channels, over opening protection, and latch or locking devices, if present. The polymeric engine hood assemblies including an exterior panel, a fender skin, and a reinforcing structure can significantly reduce manufacturing and assembly costs by integrating in one part the function of the grill opening reinforcement, air channels, hood stops, and fixations as previously discussed. The polymeric engine hood assemblies can provide structural rigidity to the hood. For example, ribs, ridges, or corrugations located on the polymeric engine hood assemblies can assist in transferring loads applied to the hood to different fixation points of the polymeric engine hood assembly to the vehicle (e.g., latch, hinge, lift assist, etc.). Ribs, ridges, or corrugations located on an engine facing surface of any of the components can assist in transferring loads applied on the hood toward a side latch fixation. Dimensions and locations for the ribs or corrugations can depend upon the manufacturing method chosen to make the polymeric engine hood assembly. For example, primary and secondary reinforcements can be present, where primary reinforcements can be used to transfer loads to the various fixation points as previously described. Secondary reinforcements can add stiffness to the body panel against buckling and pressure loads (e.g., wind, snow, drop loads). These buckling and pressure loads can describe the spacing of the secondary reinforcements in between the primary reinforcements.

Ribs, ridges, and corrugations can be included in the polymeric engine hood assembly in order to impart stiffness to the components of the polymeric engine hood assembly. The desired stiffness for each component of the polymeric engine hood assembly can vary under varying aerodynamic situations. For example, to prevent localized buckling of the skin or warping of the polymeric engine hood assembly, ribs or corrugations or ribs and corrugations can be added to the components of the polymeric engine hood assembly to create inherent stiffness in the part and avoid warping or localized buckling of the skin.

Manufacturing of the polymeric engine hood assemblies can be made by a variety of processes, including, but not limited to, injection molding, compression molding, or thermoforming. Optionally, inserts (e.g., metal inserts) can be utilized in various areas of the polymeric engine hood assembly including parts of the over opening protection, latch, or locking devices. Use of this design can result in reduction of manufacturing costs compared to designs made from thermoset or fiberglass reinforced plastic materials. Use of these designs can also enable the use of production processes such as injection molding and thermoforming to integrate the components as compared to thermoset and fiberglass reinforced plastic assemblies, which have limited feature integrations due to limitations in the forming processes, such as sheet molding compounds (SMC) or long fiber injection (LFI) Channels created in air cavities located between ridges on the reinforcing structure and engine facing surfaces of the exterior panel and the fender skin can provide thermal insulating properties to the exterior panel or the fender skin by protecting these components from heat created by the engine and can enable a broad range of polymeric materials that can be used for the exterior panel or the fender skin. The reinforcing structure or reinforcing member can include a material having the ability to withstand high temperatures (e.g., about 160° C.) to provide thermal shielding. Materials used for the polymeric engine hold assembly can include polypropylene or polyamide, for example, long glass fiber reinforced polypropylene, short glass fiber reinforced polypropylene, or glass fiber reinforced polyamide.

The exterior panel and fender skin can be made from the same or different material than the reinforcing structure. For example, the reinforcing structure can include filled polymers (e.g., glass fiber, talc, mica, etc.) in order to achieve the desired stiffness or can include a material that can withstand high temperatures (e.g., about 160° C.) such as NORYL™ to provide thermal shielding. The exterior panel and fender skin can include different materials and can desire high aesthetic quality for each surface.

A polymeric engine hood assembly for use in a vehicle can include an exterior panel, a fender skin, and a reinforcing structure or a reinforcing member. The exterior panel can include an exterior panel engine facing surface and an exterior panel outermost surface; the exterior panel can extend in an x direction. The fender skin can include a fender skin engine facing surface and a fender skin outermost surface and can be adjacent to a portion of the exterior panel engine facing surface at a junction surface. A portion of the fender skin can extend in the x direction, a portion of the fender skin can extend in a v direction, and a portion of the fender skin can extend in a z direction. The reinforcing structure can include a body. The body can include a reinforcing structure first surface and a reinforcing structure second surface. The reinforcing structure can include alternating ridges and flanges extending along the reinforcing structure in the y direction forming corrugations. The corrugations can extend at least partially transversely across the body of the reinforcing structure. Indentations can be disposed in the corrugation flanges on the reinforcing structure. The reinforcing structure can be adjacent to and can extend along a portion of an exterior panel engine facing surface and along a portion of a fender skin engine facing surface. The reinforcing structure can include a connecting ridge that extends transversely across the reinforcing structure and located between indentations. The connecting ridge can be configured to accept the junction surface of the exterior panel and the fender skin. Channels can be formed in air cavities located between the ridges on the reinforcing structure and the engine facing surface or the exterior panel and the fender skin. The reinforcing member can include a body comprising a reinforcing member first surface and a reinforcing member second surface, wherein the reinforcing member can include alternating ridges and grooves extending across the reinforcing member in the y direction forming corrugations, wherein the corrugations extend at least partially longitudinally along the body of the reinforcing member.

Optionally, a portion of the exterior panel can extend in an x direction, a portion of the exterior panel can extend in a y direction, and a portion of the exterior panel can extend in a z direction, and a portion of the fender skin can extend in the x direction, in the y direction, and in the z direction. The exterior panel can include a ridge protruding toward the reinforcing structure first surface. The ridge of the exterior panel can be configured to correspondingly mate with a complimentary ridge on the reinforcing structure, thereby forming a handle. A vehicle operator can use the handle to open the hood. The hood can be opened toward the user, i.e., can be a flip front engine hood.

The channels can provide thermal insulation to the exterior panel. The channels can provide thermal insulation to the fender skin. The channels can provide thermal insulation to the exterior panel and the fender skin.

The indentations can extend transversely in the y direction. The indentations can extend longitudinally in the x direction across the corrugation flanges. The indentations can extend transversely in the y direction and the indentations can extend longitudinally in the x direction across corrugation flanges.

A ribbed structure can be located adjacent to the exterior panel. A ribbed structure can be located adjacent to the fender skin. A ribbed structure can be located adjacent to the exterior panel and adjacent to the fender skin. The ribbed structure can include a base and ribs protruding outwardly away from the engine facing surface of the exterior panel or fender skin. The ribs can extend longitudinally in the y direction and transversely in the x direction across a portion of the exterior panel. The ribs can extend longitudinally in the x direction and transversely in the y direction along a portion of the fender skin. The ribs can extend in the x direction, the y direction, and the z direction. The reinforcing structure can include ribs extending transversely across a portion of the exterior panel engine facing surface. The reinforcing structure can include ribs extending longitudinally along a portion of the exterior panel engine facing surface. The reinforcing structure can include ribs extending diagonally across a portion of the exterior panel engine facing surface.

The fender skin can be formed by injection molding or thermoforming. The reinforcing structure can be formed by thermoforming or injection molding. The exterior panel and the reinforcing structure can be formed by thermoforming or injection molding. The thermoforming can include twin-sheet thermoforming. When formed by injection molding, the reinforcing structure can include ribs, for example, transverse ribs and longitudinal ribs. The transverse ribs and the longitudinal ribs can intersect one another. Optionally, the ribs can be disposed laterally across a portion of the engine facing surface of the exterior panel. Optionally, ribs can be disposed longitudinally across a portion of the fender skin engine facing surface.

The connecting ridge can be configured to accept the junction surface of the exterior panel and the fender skin. The reinforcing structure can be adjacent to and can extend along a portion of an exterior panel engine facing surface and along a portion of a fender skin engine facing surface.

The polymeric engine hood assembly can have a Class A surface finish on an exterior panel outermost surface and a fender skin outermost surface. For example the outermost surfaces of the assembly should desirably be smooth, glossy, and weatherable. As used herein, the term "Class A surface" refers to a surface substantially free of visible defects such as hair-lines, pin-holes and the like. In one embodiment, a Class A surface comprises a gloss of greater than 100 units at either 20 degrees or 60 degrees, a wave scan of less than 5 units (long as well as short), and a distinctness of image (DOI) of greater than 95 units.

The ribs of the polymeric engine hood assembly can be formed by an injection molding process selected from gas-assisted injection molding or co-injection molding. The ribs can have a reduced thickness at a portion of the rib that is disposed adjacent to the interior surface of the exterior panel or reinforcing structure.

A vehicle can include a structural body and the polymeric engine hood assembly.

Vehicle original equipment manufacturers are continually looking for solutions to reduce cost. Operating costs of commercial vehicles, such as trucks, and repair costs of vehicles, such as cars and trucks, are under constant pressure from the vehicle industry, insurance companies, and end users to reduce costs. Reductions of repair cost and repair time, which in the case of commercial vehicles has a direct effect on the commercial operational efficiency of such a vehicle, can provide a direct value to vehicle end users and owners, including commercial vehicle fleet owners. The front end module disclosed herein can reduce a commercial vehicle's "down time" when certain components of the vehicle are damaged while in use, By swiveling away the light support unit in case of damage, it can be easier and more efficient to replace the damaged light support unit or front end module. A reduction of "down time" of a vehicle can mean increased operating time and higher commercial efficiency of a vehicle. Another means to save cost can be to limit the damage to the vehicle in case of impact. By allowing the light support unit to rotate away in case of impact, costly damage to both the light support unit and adjacent structures can be reduced or avoided. A reduction of the total vehicle weight by using a polymeric front end module or light support unit can result in reduction of total vehicle weight thereby the vehicle's emissions, while increasing the mileage of the vehicle. By using injection molding or injection compression molding or compression molding processes to make the part, technical functions can be integrated into the part, the total vehicle assembly part count and part production steps can be reduced, which can have a positive effect on part production cost.

A front end module can be situated at a front of a vehicle directly under an outside surface. It can be connected to hinges on the engine hood and can move with the opening of the hood, with respect to the vehicle frame. The front end module can provide overall torsional, vertical, and lateral stiffness to the fender skins and the front of the hood. The front end module can transfer applied loads toward the hinge fixations on the hood. The front end module can integrate hinges, the lift assist assembly, lighting assembly, grab handle, air channels, and the grill opening reinforcement. Manufacturing of the front end module can occur in a single step through injection molding, compression molding, or injection compression molding. Inserts, e.g., metal inserts can be utilized for example, on the lift assist connectors or parts of the hinge assembly.

The front end module can include an injection molded polymeric base extending from a left fender skin to a right fender skin. The injection molded base can include an upper beam, a lower beam, and a middle beam dispersed between the upper beam and the lower beam, for example, two middle beams can be disposed between the upper beam and the lower beam. Headlamp and grill openings can be formed between the upper and lower beams, wherein the headlamp openings can be located adjacent to the left fender skin or the right fender skin. The grill openings can be located in a center portion of the front end module. The injection molded base can further include a lift assist connect disposed in corner top portions of the middle beams of the injection molded base, air channels located in the middle beams, headlamp support structures and a grill opening reinforcement located in the openings, hinges integrated in the lower beam, and a grab handle reinforcement structure located on the upper beam.

The front end module can include a hollow base or a ribbed base. The integrated hinges can increase overall stiffness of the front end module. The front end module can have a 5 to 50% weight reduction as compared to a front end module made from thermoset or fiberglass reinforced plastic materials, for example, 10 to 30% weight reduction, for example 15 to 25% weight reduction. The ribbed base can include ribs dispersed along portions of at least one of the upper beam, the lower beam, or the middle beam.

The front end module can optionally include a moveable light support unit disposed in and extending from the headlamp openings. The light support unit can include a hinge connection and a snap fit connection configured to attach to the middle beam. The light support unit can move away from the middle beam and toward the grip opening during a collision. The light support unit can further include indentations located in a base section of the light support unit. The indentations can be configured to mate with hooks extending from the lower beam to hold the light support unit in a stationary position.

A polymeric engine hood assembly can include the polymeric engine hood assembly and the front end module. A vehicle can comprise a structure component, the polymeric engine hood assembly, and the front end module.

Optionally, the front end module can include a light support unit mounted onto the front end module. The light support unit and the front end module can each, independently, comprise a polymeric material. The light support unit can be mounted onto the front end module such that it can rotate and swivel away from the front end module and the outermost surfaces of the vehicle. The light support unit can be fixed to the front end module in order to avoid rotation and swiveling by means of a locking feature, such as a snap fit or hook connection. The light support unit can be fixed to the front end module and/or to the outermost surface of the hood by other connection means, including, but not limited to, adhesive tape.

The light support unit can provide support to the light unit, which is mounted onto the vehicle. The light support unit can provide additional torsional, vertical, and lateral stiffness to the outermost surfaces of the hood. The light support unit can transfer applied loads toward the fixing positions of the light support unit to the front end module. The light support unit can rotate and swivel away from the front end module and the outermost surfaces of the hood to facilitate ease of removal or replacement of the light support unit or the outermost surfaces of the hood, e.g., in case of damage of the light support or the outermost surfaces of the hood. The light support unit can rotate and swivel away from the front end module and outermost surface of the hold to prohibit damage to the front end module, e.g., upon an impact in the area of the front end module. The light support unit can integrate mounting features and hinging features to enable rotation of the part related to the front end module and locking features that fix the part into a solid position onto the front end module or the outermost surface of the hood. Manufacturing of the light support unit can occur in a single step through injection molding, compression molding, or injection compression molding. Inserts, e.g., metal inserts can be utilized for example, on the lift assist connectors or parts of the hinge assembly.

The polymeric engine hood assembly and front end module components can comprise a metallic material, a polymeric material, a composite material, or a combination comprising at least one of the foregoing. The polymeric engine hood assembly and front end module components can comprise any polymeric material or combination of polymeric materials that can be formed into the desired shape and provide the desired properties. Exemplary materials include polymeric materials as well as combinations of polymeric materials with elastomeric materials, and/or thermoset materials. Exemplary materials can also include elastomeric materials or thermoset materials. In one embodiment, the polymeric materials comprise thermoplastic materials. Possible polymeric materials include polybutylene terephthalate (PBT); acrylonitrile-butadiene-styrene (ABS, CYCOLAC™ resins, commercially available from SABIC's Innovative Plastics business); polycarbonate (LEXAN™ and LEXAN™ EXL resins, commercially available from SABIC's Innovative Plastics business); polyethylene terephthalate (PET); polycarbonate/PBT blends; polycarbonate/ABS blends (CYCOLOY™ resins, commercially available from SABIC's Innovative Plastics business); copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC's Innovative Plastics business); blends of polycarbonate/PET/PBT; PBT and impact modifier (XENOY™ resins, commercially available from SABIC's Innovative Plastics business); polyamides (Nylon 6, Nylon 6-6, Nylon 6-9, Nylon 6-10, Nylon 6-12, Nylon 11, Nylon 12. Nylon 4-6, etc.); phenylene sulfide resins; polyvinyl chloride (PVC); high impact polystyrene (HIPS); polyolefins, e.g., low/high density polyethylene (L/HDPE), polypropylene (PP), expanded polypropylene (EPP); polyethylene and fiber composites; polypropylene and fiber composites (AZDEL Superlite™ sheets, commercially available from Azdel, Inc.); long fiber reinforced thermoplastics (VERTON™ resins, commercially available from SABIC's Innovative Plastics business), thermoplastic olefins (TPO), and carbon fiber reinforced polymeric composites (CFRP), glass fiber reinforced polymeric composites (GFRP), as well as combinations comprising at least one of the foregoing.

An exemplary filled resin is STAMAX™ resin, which is a long glass fiber filled polypropylene resin also commercially available from SABIC's Innovative Plastics business. Some possible reinforcing materials include fibers, such as glass, carbon, and so forth, as well as combinations comprising at least one of the foregoing; e.g., long glass fibers and/or long carbon fiber reinforced resins. For example, carbon fiber reinforced polymeric composites can be utilized to form the lobes, Carbon fiber reinforced polymeric composites can be used as a coating (e.g., skin) on the polymeric engine hood assembly to provide the desired structural integrity to the polymeric engine hood assembly. The polymeric engine hood assembly can be formed from combinations comprising at least one of any of the above-described materials.

The polymeric materials disclosed herein can include fillers or reinforcing agents. Possible fillers or reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (atmospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymer matrix. Fillers are used in amounts of 1 to 200 parts by weight, based on 100 parts by weight of based on 100 parts by weight of the total composition.

Processes for making the polymeric engine hood assembly and front end module components disclosed herein are also contemplated. For example, various molding processes can be used to make polymeric engine hood assembly and front end module components including, but not limited to, injection molding, thermoforming, compression molding, etc.

A method of making a polymeric engine hood assembly for use in a vehicle can comprise placing a first polymeric sheet into a first mold half, placing a second polymeric sheet into a second mold half, applying heat to the first mold half and the second mold half, applying pressure to the first mold half and the second mold half to move the first mold half and the second mold half toward one another, applying a clamping pressure to the first mold half and the second mold half, and attaching the exterior panel to a fender skin at a junction surface, wherein the reinforcing structure includes a connecting ridge extending transversely across the reinforcing structure located between indentations. The first polymeric sheet can form an exterior panel and the second polymeric sheet can form a reinforcing structure including a body comprising a reinforcing structure first surface and a reinforcing structure second surface. The reinforcing structure can include alternating ridges and flanges extending across the reinforcing structure in the x direction forming corrugations. The corrugations can extend at least partially longitudinally along the body of the reinforcing structure. The indentations can be disposed in the corrugation flanges on the reinforcing structure.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 10:
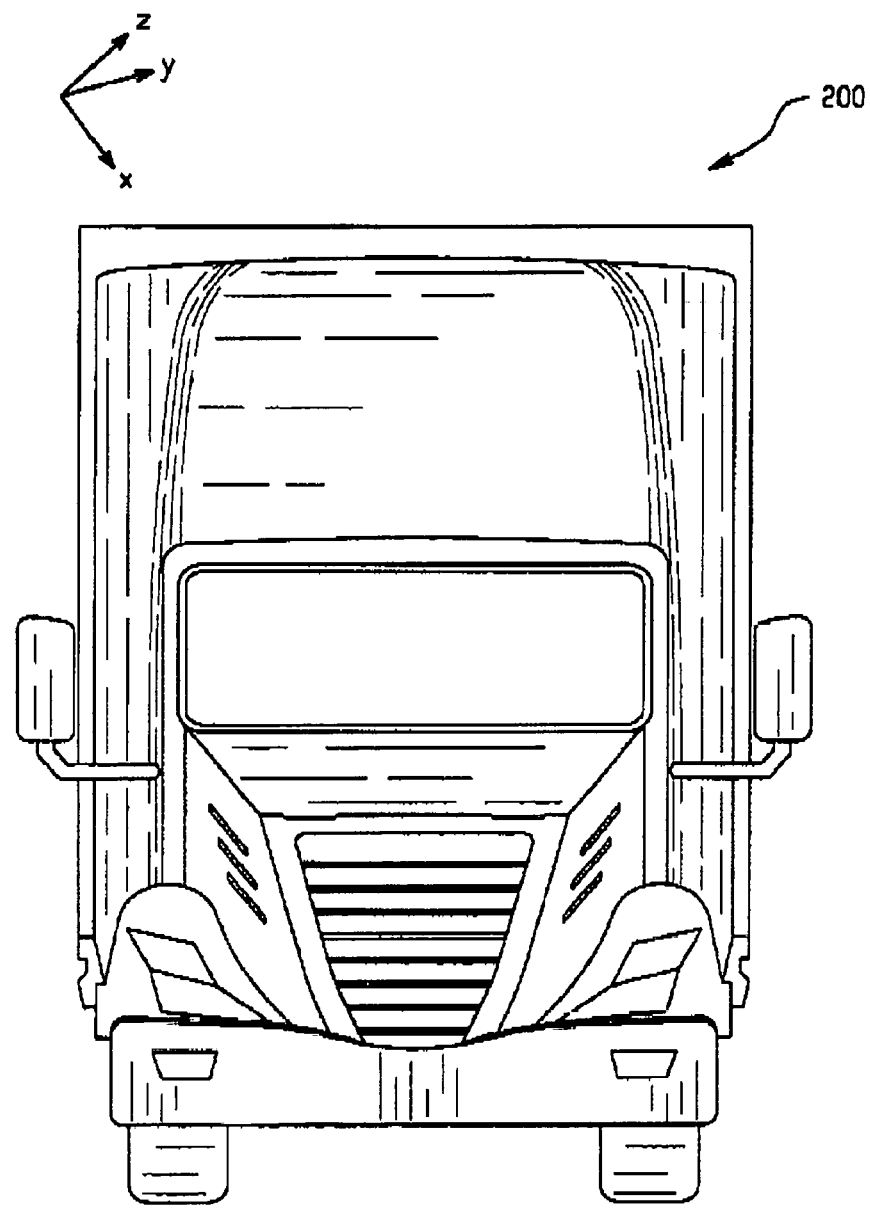
FIG. 10 is a front view of a vehicle.

FIG. 1 illustrates a polymeric engine hood assembly 100 for use in a vehicle (see e.g., truck 200 in FIG. 10). The polymeric engine hood assembly 100 can include an exterior panel 52, a fender skin 51, and a reinforcing structure 53. The exterior panel 52 can include an exterior panel outermost surface 21 and an exterior panel engine facing surface 23. The exterior panel 52 can extend in an x direction as illustrated by the x, y, z coordinate system in FIG. 1. The fender skin 51 can be located adjacent to a portion of the exterior panel facing surface 23 at a junction surface 56. The fender skin 51 can include a fender skin outermost surface 25 and a fender skin engine facing surface 27. The fender skin 51 can include two lower fenders and two upper fenders connected by a hood panel. A portion of the fender skin 51 can extend in the x direction, a portion of the fender skin 51 can extend in the y direction, and a portion of the fender skin 51 can extend in the z direction. The reinforcing structure 53 can include a body 20 including a reinforcing structure first surface 29 and a reinforcing structure second surface 31. The reinforcing structure 53 can include alternating ridges 14 and flanges 35 extending at least partially along the reinforcing structure 53 in the y direction. The alternating ridges 14 and flanges 35 can form corrugations 37 that can extend at least partially transversely across the body 20 of the reinforcing structure 53, where one ridge 14 adjacent to one flange 35 forms a corrugation 37. "Corrugation" as described herein refers to folds or parallel and alternating ridges and flanges. Indentations 19 can be disposed in the flanges 35 on the reinforcing structure 53. The area between adjacent ridges 14 and indentations 19 in FIG. 1, i.e., flanges 35 can form a "closed-in" or "box-like" structure. This closed-in structure can have dimensions of 3 feet wide by 3 feet long, for example, 2 feet wide by 2 feet long, for example, 1 foot wide by 1 foot long. The reinforcing structure 53 can be adjacent to the exterior panel engine facing surface 23. The reinforcing structure 53 can be adjacent to a fender skin engine facing surface 27. The reinforcing structure 53 can extend along a portion of the exterior panel engine facing surface 23. The reinforcing structure 53 can extend along a portion of the fender skin engine facing surface 27. The reinforcing structure 53 can include a connecting ridge 22. The connecting ridge 22 can extend transversely across the reinforcing structure 53 with the connecting ridge 22 being located between indentations 19. The connecting ridge 22 can be configured to accept the junction surface 56 of the exterior panel 52 and the fender skin 51. Channels 24 can be formed in air cavities located between the ridges 14 on the reinforcing structure 53 and the exterior panel engine facing surface 23 and the fender skin engine facing surface 25.

The channels 24 can provide thermal insulation to the exterior panel 52 and to the fender skin 51. Thermal insulation properties of the exterior panel 52 can allow the exterior panel 52 to be made from a different material from that of the reinforcing structure 53, since the exterior panel 52 can be protected from heat emanating from the engine by the channel 24. Thermal insulation properties of the fender skin 51 can allow the fender skin 51 to be made from a different material from that of the reinforcing structure 53, since the fender skin 51 can be protected from heat emanating from the engine by the channel 24. A foam or other filler or noise reduction material can be placed in the channel 24 in order to reduce noise. The corrugations 37 can extend transversely in the y direction. The indentations 19 can extend longitudinally in the x direction across the corrugation flanges 35.

The fender skin 51 can be formed by injection molding or thermoforming. The reinforcing structure 53 can be formed by thermoforming or injection molding. The exterior panel 52 and the reinforcing structure 53 can be formed as a one piece integral unit where the exterior panel 52 and the reinforcing structure 53 can be manufactured by twin-sheet thermoforming. The exterior panel 52, the fender skin 51, or the reinforcing structure can each, independently, comprise polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyolefins, polypropylene, or a combination comprising at least one of the foregoing. The polymeric material can include fiber reinforcement selected from glass, carbon, or a combination comprising at least one of the foregoing.

The exterior panel 52 can include a ridge 26 protruding toward the reinforcing structure first surface 29. The ridge 26 on the exterior panel 52 can be configured to correspondingly mate with a complimentary ridge 14A on the reinforcing structure 53. The mating of ridges 14A and 26 can form a handle that an operator can grasp when opening the polymeric engine hood assembly 100. The reinforcing structure 53 can include an insert 54 located near various fixation locations on the reinforcing structure 53. The insert 54 can include a polymeric insert, a metallic insert, or a combination comprising at least one of the foregoing. The insert 54 can bring loads applied on a vehicle hood 88 toward latch 55, where latch 55 assists a vehicle hood 88 to remain in a closed position.

The exterior panel 52 can extend transversely across the vehicle hood 88, while the fender skin 51 can be located on either end portion 90, 92 of the vehicle hood 88. The polymeric engine hood 100 assembly can open toward an operator with the polymeric engine hood assembly 100 opening away from a vehicle's windshield. Headlamp openings 15 and grill opening 17 can be located on a portion of the polymeric engine hood assembly 100 opposite the opening portion 94 of the vehicle hood 88.

Figure 2:
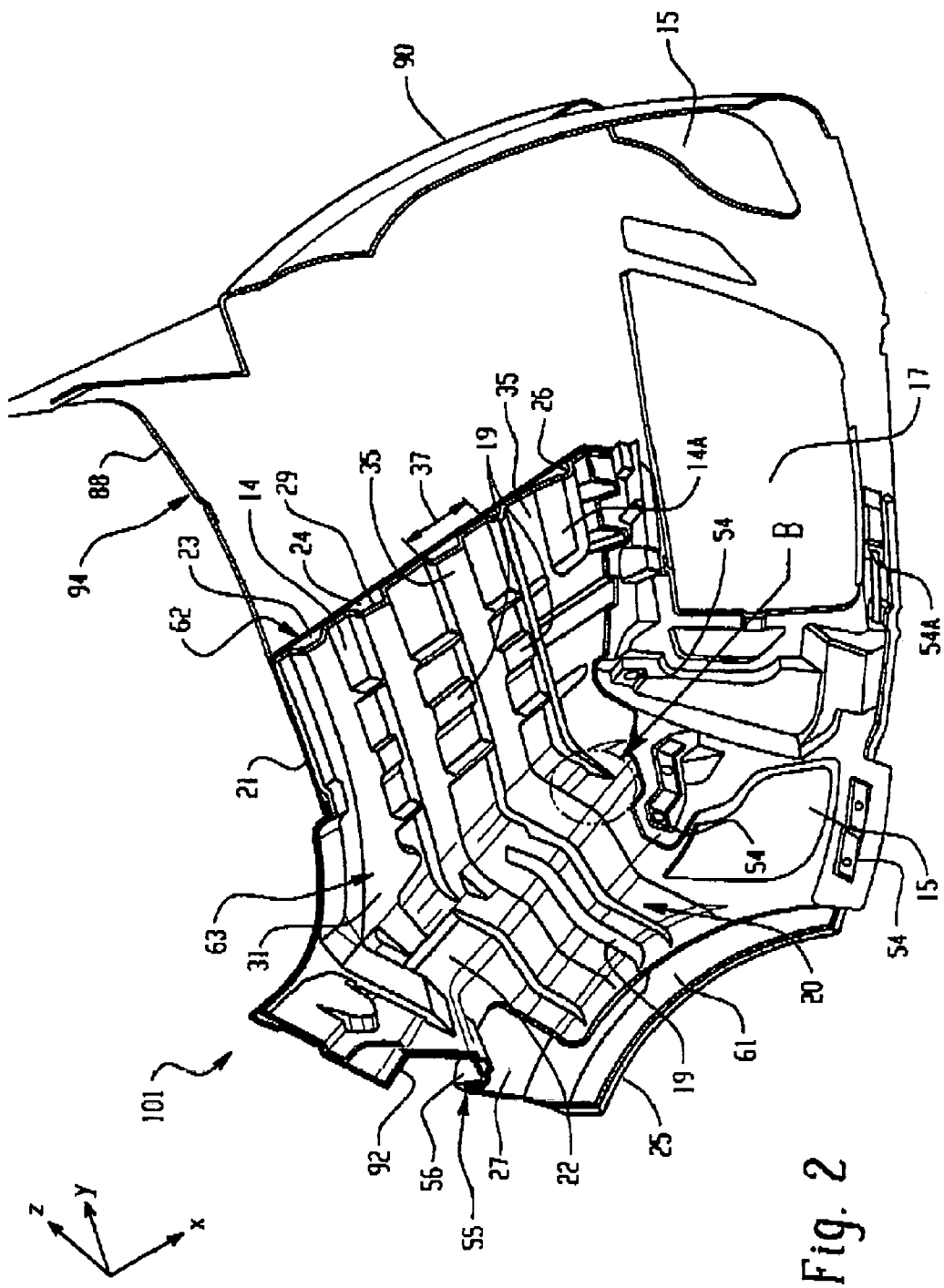
FIG. 2 is an engine facing view of another polymeric engine hood assembly.

Turning now to FIG. 2, a polymeric engine hood assembly 101 is illustrated. The polymeric engine hood assembly 101 can include an exterior panel 62, a fender skin 61, and a reinforcing structure 63. The exterior panel 62 can include an exterior panel outermost surface 21 and an exterior panel engine facing surface 23. A portion of the exterior panel 62 can extend in an x direction as illustrated by the x, y, z coordinate system in FIG. 2. A portion of the exterior panel 62 can extend in a y direction. A portion of the exterior panel 62 can extend in a z direction. The fender skin 61 can be located adjacent to a portion of the exterior panel engine facing surface 23 at a junction surface 56. The fender skin 61 can include a fender skin outermost surface 25 and a fender skin engine facing surface 27. A portion of the fender skin 61 can extend in the y direction. A portion of the fender skin 61 can extend in the x direction. A portion of the fender skin 61 can extend in the z direction. The reinforcing structure 63 can include a body 20 including a reinforcing structure first surface 29 and a reinforcing structure second surface 31. The reinforcing structure can include alternating ridges 14 and flanges 35 extending at least partially across the reinforcing structure 63 in the x direction. The alternating ridges 14 and flanges 35 can form corrugations 37 that can extend at least partially longitudinally along the body 20 of the reinforcing structure 63, where one ridge 14 adjacent to one flange 35 forms a corrugation 37.

The reinforcing structure 63 can be adjacent to the exterior panel engine facing surface 23. The reinforcing structure 63 can be adjacent to the fender skin engine facing surface 27. The reinforcing structure 63 can extend along a portion of the exterior panel engine facing surface 23. The reinforcing structure 63 can extend along a portion of the fender skin engine facing surface 27. The reinforcing structure 61 can include a connecting ridge 22. The connecting ridge 22 can extend transversely across the reinforcing structure 63. The connecting ridge 22 can be configured to accept the junction surface 56 of the exterior panel 62 and the fender skin 61. Channels 24 can be formed in air cavities located between the ridges 14 on the reinforcing structure 63 and the exterior panel engine facing surface 23 and the fender skin engine facing surface 27.

The channels 24 can provide thermal insulation to the exterior panel 62 and to the fender skin 61. Thermal insulation properties of the exterior panel 62 can allow the exterior panel 62 to be made from a different material from that of the reinforcing structure 63 or the fender skin 61, since the exterior panel 62 can be protected from heat emanating from the engine by the channel 24. A foam or other filler or noise reduction material can be placed in the channel 24 in order to reduce noise. The fender skin 61 can be formed by injection molding or thermoforming. The reinforcing structure 63 can be formed by thermoforming or injection molding. The exterior panel 62 and the reinforcing structure 63 can be formed as a one piece integral unit where the exterior panel 62 and the reinforcing structure 63 are manufactured by twin-sheet thermoforming. The exterior panel 62, the fender skin 61, or the reinforcing structure 63 can each, independently, comprise polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyolefins, polypropylene, or a combination comprising at least one of the foregoing. The polymeric material can include fiber reinforcement selected from glass, carbon, or a combination comprising at least one of the foregoing.

The exterior panel 62 can include a ridge 26 protruding toward the reinforcing structure first surface 29. The ridge 26 on the exterior panel 62 can be configured to correspondingly mate with a complimentary ridge 14A on the reinforcing structure 63. The mating of ridges 14A and 26 can form a handle that an operator can grasp when opening the polymeric engine hood assembly 101. The reinforcing structure 63 can include an insert 54 located near various fixation locations on the reinforcing structure 63. The insert 54 can include a polymeric insert, a metallic insert, or a combination comprising at least one of the foregoing. The insert 54 can bring loads applied on a vehicle hood 88 toward latch 55, where the latch 55 can assist a vehicle hood 88 to remain in a closed position.

The exterior panel 62 can extend transversely across the vehicle hood 88 in the x direction, longitudinally in the y direction, and outwardly in the z direction until meeting junction surface 56 with the fender skin 61. The fender skin 61 can be located on either end portion 90, 92 of the vehicle hood 88. The polymeric engine hood 101 assembly can open toward an operator with the polymeric engine hood assembly 101 opening away from a vehicle's windshield. Headlamp openings 15 and a grill opening 17 can be located on a portion of the polymeric engine hood assembly 101 opposite the opening portion 94 of the vehicle hood 88.

Figure 3:
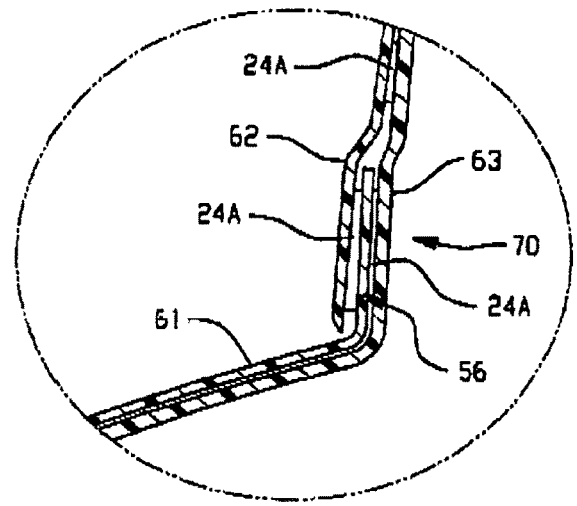
FIG. 3 is a cross-sectional view of section B of the polymeric engine hood assembly of FIG. 2.

FIG. 3 illustrates a cross-sectional view of section B 70 of the polymeric engine hood assembly 101. As can be seen in FIG. 3, junction surface 56 can join fender skin 61, exterior panel 62, and reinforcing structure 63 with a bonding system 24A located on either side of the assembly 101. For example, the bonding system 24A can be located in the space between fender skin 61 and reinforcing structure 63, between exterior panel 62 and reinforcing structure 63, and between exterior surface 62 and fender skin 61 and fender skin 61 and reinforcing structure 63. The bonding system 24A can include an adhesive bonding system 24A (e.g., glue).

Figure 4B:
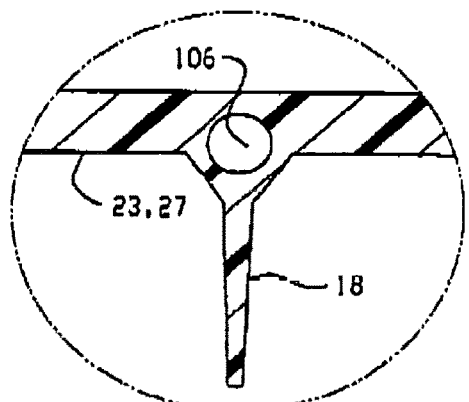
FIG. 4B is a cross-sectional view of a rib of the polymeric engine hood assembly of FIG. 4A.

Turning now to FIGS. 4A through 4E, a polymeric engine hood assembly 105 for use in a vehicle is shown. In FIG. 4A, the polymeric engine hood assembly 105 can include an exterior panel 12, a fender skin 11, a front end module 13A, and a reinforcing member 13. The exterior panel 12 can include an exterior panel outermost surface 21 and an exterior panel engine facing surface 23, The exterior panel 12 can extend in an x direction as illustrated by the x, y, z coordinate system in FIG. 4A. The exterior panel 12 can extend in a y direction. The exterior panel 12 can extend in a z direction. The fender skin 11 can be located adjacent to a portion of the exterior panel engine facing surface 23 at a junction surface 56. The fender skin 11 can include a fender skin outermost surface 25 and a fender skin engine facing surface 27. A portion of the fender skin 11 can extend in the x direction, a portion of the fender skin 11 can extend in the y direction, and a portion of the fender skin 11 can extend in the z direction. The reinforcing member 13 can attach to and extend along a portion of an exterior panel engine facing surface 23 and along a portion of a fender skin engine facing surface 27. The reinforcing member 13 can include a ridge 14 and flanges 35 extending transversely across the reinforcing structure in the x direction forming a corrugation 37. Ribs 18 can be disposed laterally across a portion of the exterior panel engine facing surface 23. Ribs 18 can be disposed across a portion of the fender skin engine facing surface 27. The reinforcing structure 13 can include a connecting ridge 22. The connecting ridge 22 can extend transversely across the reinforcing member 13. The connecting ridge 22 can be configured to accept the junction surface 56 of the exterior panel 12 and the fender skin 11. A channel 24 can be formed in an air cavity located between the ridges 14 on the reinforcing member 13 and the exterior panel engine facing surface 23 and the fender skin engine facing surface 25.

The channel 24 can provide thermal insulation to the exterior panel 12 and to the fender skin 11. Thermal insulation properties of the exterior panel 12 and/or the fender skin 11 can allow the exterior panel 12 and/or the fender skin 11 to be made from a different material from that of the reinforcing member 13, since the exterior panel 12 can be protected from heat emanating from the engine by the channel 24. A foam or other filler or noise reduction material can be placed in the channel 24 in order to reduce noise. The ribs 18 can extend longitudinally in the x direction and can be located between the ridges 14. The ribs 18 can extend transversely in the y direction and can be located between the ridges 14. The ribs 18 can extend longitudinally in the x direction and transversely in the y direction, where the ribs 18 can be located between the ridges 14. The ribs 18 can extend outwardly in the z direction. The ribs 18 can extend longitudinally in the x direction, transversely in the y direction, and outwardly in the z direction. The transverse ribs 18 and the longitudinal ribs 18 can intersect one another. The fender skin 11 can be formed by injection molding or thermoforming. The reinforcing structure 13 can be formed by injection molding. The exterior panel 12 and the reinforcing member 13 can be formed as a one piece integral unit where the exterior panel 12 and the reinforcing member 13 manufactured by twin-sheet thermoforming.

The exterior panel 12, the fender skin 11, or the reinforcing structure can each, independently, comprise polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyolefins, polypropylene, or a combination comprising at least one of the foregoing. The polymeric material can include fiber reinforcement selected from glass, carbon, or a combination comprising at least one of the foregoing.

The exterior panel 12 can include a ridge 26 configured to correspondingly mate with a complimentary ridge 14 on the front end module 13A. The mating of ridges 14 and 26 can form a handle that an operator can grasp when opening the polymeric engine hood assembly 105. The front end module 13A can include an insert 54 (see e.g., FIG. 1 or 2) located near various fixation locations on the front end module 13A. The insert 54 can bring loads applied by radiator and headlamp and loads applied on a vehicle hood 88 toward hinges 54A, where hinges 54A assists a vehicle hood 88 to be opened. The reinforcing member 13 can include an insert 54 (see e.g., FIG. 1 or 2) located near various fixation locations on the reinforcing member 13. The insert 54 can include a polymeric insert, a metallic insert, or a combination comprising at least one of the foregoing. The insert 54 can bring loads applied on a vehicle hood 88 toward latch 55, where latch 55 assists a vehicle hood 88 to remain in a closed position.

The exterior panel 12 can extend transversely across the vehicle hood 88, while the fender skin 11 can be located on either end portion 90, 92 of the vehicle hood 88. The polymeric engine hood 105 assembly can open toward an operator with the polymeric engine hood assembly 105 opening away from a vehicle's windshield. Headlamp openings 15 and a grill opening 17 can be located on a portion of the polymeric engine hood assembly 105 opposite the opening portion 94 of the vehicle hood 88.

The polymeric engine hood assembly 105 can have a Class A surface finish on the exterior panel outermost surface 21. The polymeric engine hood assembly 105 can have a Class A surface finish on the fender skin outermost surface 25.

Figure 4C:
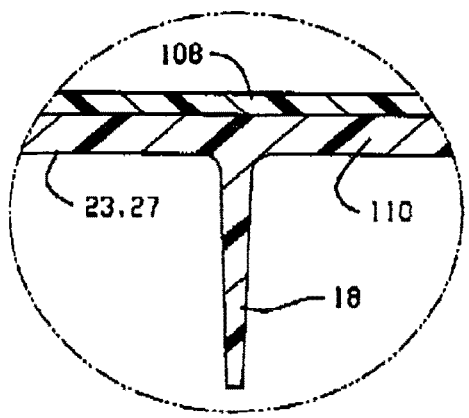
FIG. 4C is a cross-sectional view of a rib of the polymeric engine assembly of FIG. 4A.
Figure 4D:
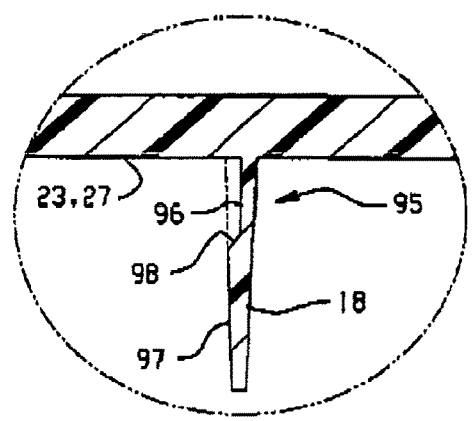
FIG. 4D is a cross-sectional view of a rib of the polymeric engine hood assembly of FIG. 4A.

FIGS. 4B, 4C, and 4D illustrate the ribs 18 in further detail. For example, FIG. 4B illustrates a cross-section of rib 18 that has been formed by a gas-assisted injection molding process, where rib 18 extends from the exterior panel engine facing surface 23 or from the fender skin engine facing surface 27. In gas-assisted injection molding, gas is blown into hole 106 to create a hollow rib 18. The gas assists in counter-acting volumetric shrinkage of the part as well as minimizing sink marks, which can affect the surface appearance of the part. FIG. 4C illustrates a cross-section of rib 18 that has been formed by a 2-component molding process, where rib 18 extends from the exterior panel engine facing surface 23 or from the fender skin engine facing surface 27. By using different materials for the ribs (e.g., first material 110 and second material 108), the possibility of using either foamed materials or filled materials to minimize the shrinkage, sink marks, etc. can be enabled. With such a design, stiffness can be maximized. The second material 108 used for the skin can be unfilled and can provide an aesthetically acceptable surface. FIG. 4D illustrates a cross-section of rib 18 that has been formed by an injection molding process with a cored-out rib base 95, where rib 18 extends from the exterior panel engine facing surface 23 or from the fender skin engine facing surface 27. The cored-out rib base 95 can include a root 96 extending longitudinally from the exterior panel engine facing surface 23 or from the fender skin engine facing surface 27. The root 96 can be connected to a member 97 by an angled ledge 98. The mast 96 can have a smaller thickness than the member 97. For example, the root 96 can have a thickness that is 25% less than that of the exterior panel engine facing surface 23 or from the fender skin engine facing surface 27, for example, 50% less, for example, 75% less. The cored-out rib base 95 can be formed by using sliders in the injection molding tool. Reducing the base thickness of the ribs (i.e., of root 96) can enable a reduction in the volume of materials at the junction of the rib 18 with the exterior panel engine facing surface 23 or the fender skin engine facing surface 27. Reduction in volume can lead to a reduction in volumetric shrinkage and therefore a reduction in the visibility of the sink marks on the aesthetical surface.

Figure 4E:
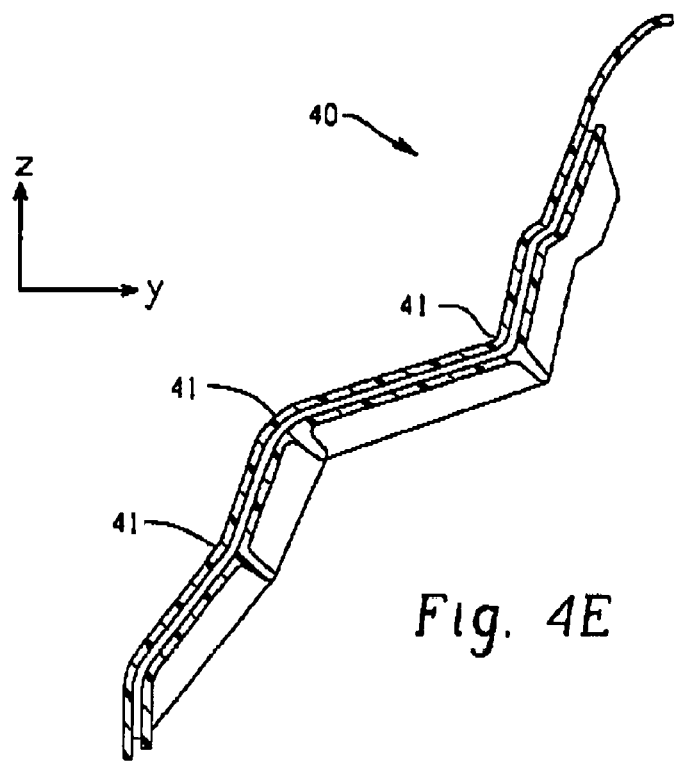
FIG. 4E is a cross-sectional view of a portion of the polymeric engine hood assembly of FIG. 4A along line A-A.
Figure 4F:
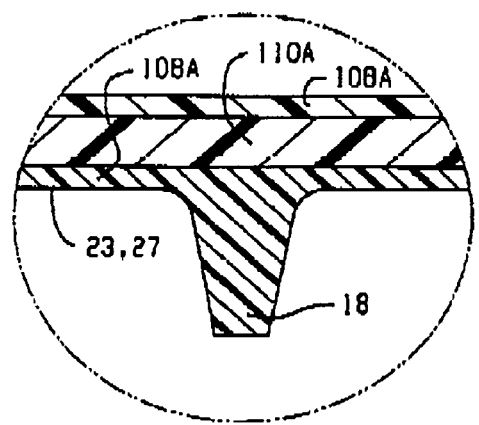
FIG. 4F is a cross-sectional view of a rib formed by a co-injection molding process.

FIG. 4F illustrates a cross-section of rib 18 that has been formed by a co-injection molding process, where rib 18 extends from the exterior panel engine facing surface 23 or from the fender skin engine facing surface 27. By using different materials for the core and the skins (e.g., first material 108A, then material 110A and finally material 108A), the possibility of using either foamed materials or filled materials to minimize the shrinkage, sink marks, etc. can be enabled. With such a design, stiffness can be maximized through a sandwich like structure. The material 108A used for the skins can be unfilled and can provide an aesthetically acceptable surface.

A fender cross-section 40 taken along line A-A in FIG. 4A is illustrated in FIG. 4E. As can be seen in FIG. 4E, the design lines 41 can increase intrinsic stiffness of the polymeric engine hood design 105.

Figure 5:
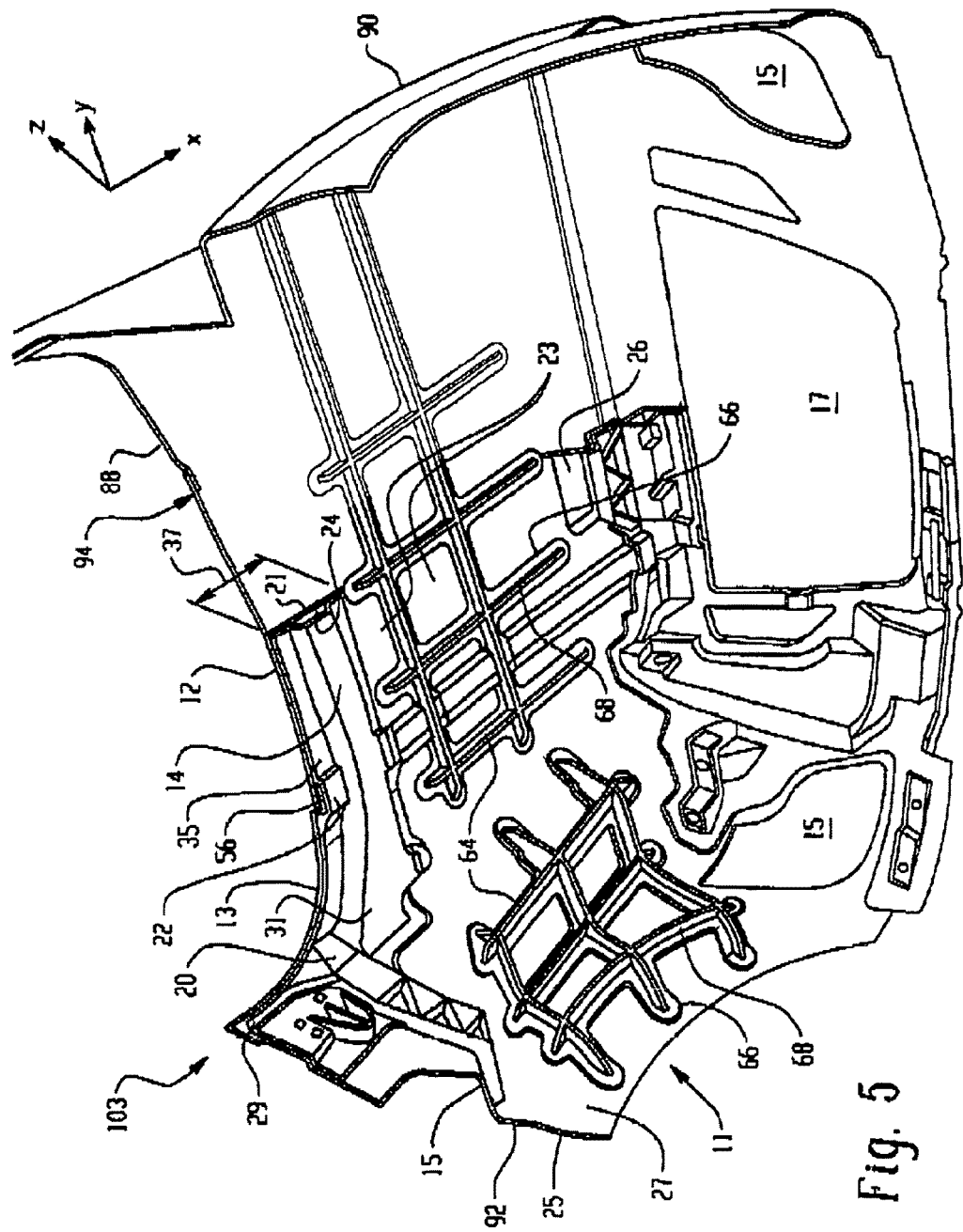
FIG. 5 is an engine facing view of another polymeric engine hood assembly.

FIG. 5 illustrates a polymeric engine hood assembly 103 for use in a vehicle. In FIG. 5, the polymeric engine hood assembly 103 can include an exterior panel 12, a fender skin 11, a reinforcing member 13, and a ribbed structure 64. The exterior panel 12 can include an exterior panel outermost surface 21 and an exterior panel engine facing surface 23. The exterior panel 12 can extend in an x direction as illustrated by the x, y, z coordinate system in FIG. 5. The fender skin 11 can be located adjacent to a portion of the exterior panel engine facing surface 23 at a junction surface 56. The fender skin 11 can include a fender skin outermost surface 25 and a fender skin engine facing surface 27. A portion of the fender skin 11 can extend in the x direction, a portion of the fender skin 11 can extend in the y direction, and a portion of the fender skin 11 can extend in the z direction. The reinforcing member 13 can include a body 20 including a reinforcing structure first surface 29 and a reinforcing structure second surface 31. The reinforcing member 13 can attach to and extend along a portion of an exterior panel engine facing surface 23 and along a portion of a fender skin engine facing surface 27. The reinforcing member 13 can include a ridge 14 and two flanges 35 extending transversely across the reinforcing member 13 in the y direction forming a corrugation 37.

A ribbed structure 64 adjacent to the exterior panel 12 and the fender skin 11 can include a base 66 and ribs 68 protruding outwardly away from the exterior panel engine facing surface 23 or the fender skin engine facing surface 27. The ribs 68 can extend longitudinally in the x direction and transversely in the y direction along a portion of the exterior panel 12 and/or the fender skin 11. The ribs 68 can extend vertically in the z direction along a portion of the fender skin also. The reinforcing member 13 can include a connecting ridge 22, The connecting ridge 22 can extend transversely across the reinforcing member 13. The connecting ridge 22 can be configured to accept the junction surface 56 of the exterior panel 12 and the fender skin 11. A channel 24 can be formed in an air cavity located between the ridges 14 on the reinforcing member 13 and the exterior panel engine facing surface 23 and the fender skin engine facing surface 27.

The channel 24 can provide thermal insulation to the exterior panel 12 and to the fender skin 11. Thermal insulation properties of the exterior panel 12 and/or fender skin 11 can allow the exterior panel 12 and/or fender skin 11 to be made from a different material from that of the reinforcing member 13, since the exterior panel 12 can be protected from heat emanating from the engine by the channel 24. A foam or other filler or noise reduction material can be placed in the channel 24 in order to reduce noise. The exterior panel 12, the fender skin 11, or the reinforcing structure can each, independently, comprise polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyolefins, polypropylene, or a combination comprising at least one of the foregoing.

The polymeric material can include fiber reinforcement selected from glass, carbon, or a combination comprising at least one of the foregoing.

The exterior panel 12 can extend transversely across the vehicle hood 88, while the fender skin 11 can be located on either end portion 90, 92 of the vehicle hood 88. The polymeric engine hood assembly 103 can open toward an operator with the polymeric engine hood assembly 103 opening away from a vehicle's windshield. Headlamp openings 15 and grill opening 17 can be located on a portion of the polymeric engine hood assembly 103 opposite the opening portion 94 of the vehicle hood 88. The polymeric engine hood assembly 103 can have a Class A surface finish on the exterior panel outermost surface 21. The polymeric engine hood assembly 103 can have a Class A surface finish on the fender skin outermost surface 25.

The exterior panel 12 can include a ridge 26 that can form a handle that an operator can grasp when opening the polymeric engine hood assembly 105.

Figure 6:
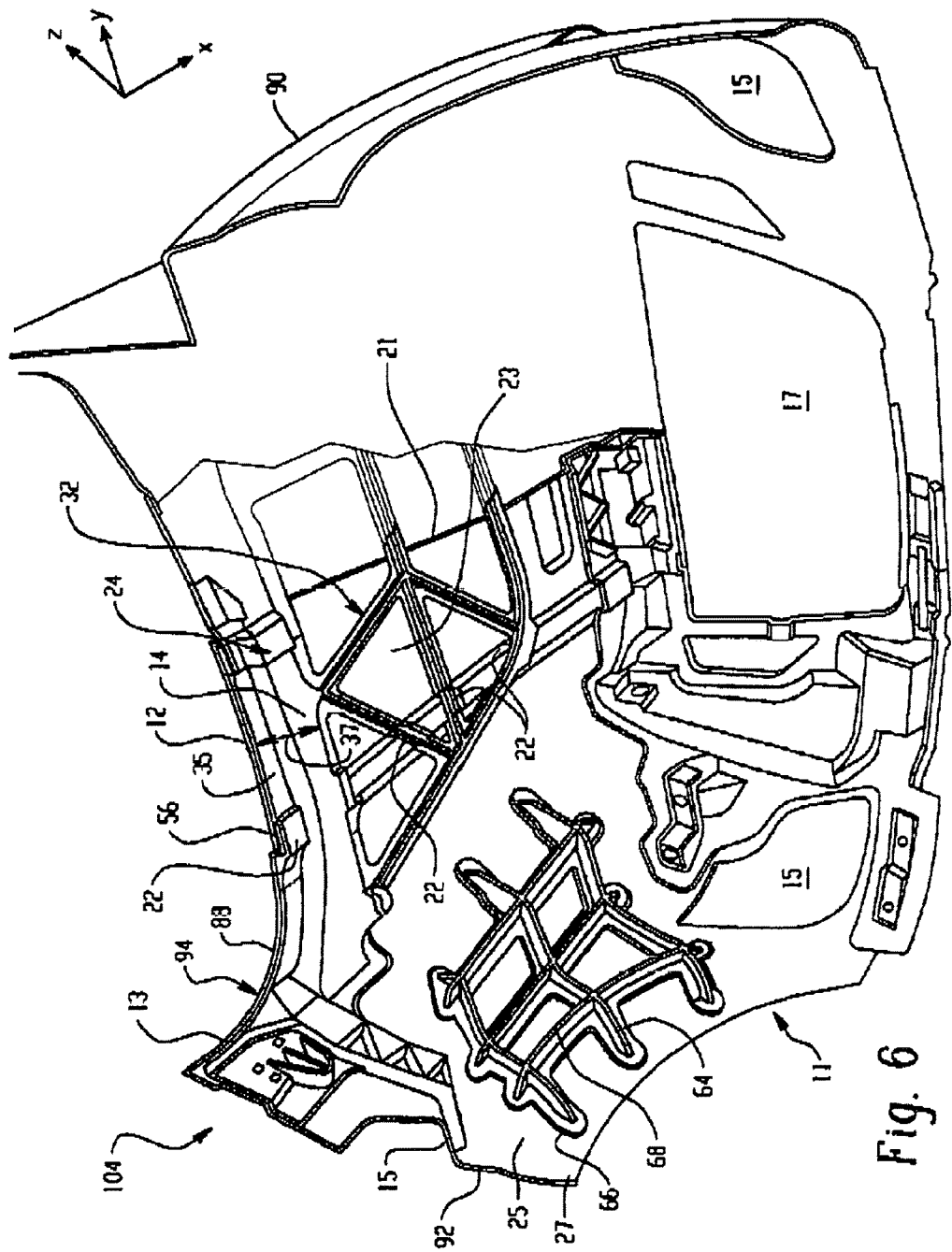
FIG. 6 is an engine facing view of another polymeric engine hood assembly.

FIG. 6 illustrates a polymeric engine hood assembly 104 for use in a vehicle. In FIG. 6, the polymeric engine hood assembly 104 can include an exterior panel 12, a fender skin 11, a reinforcing member 13, and a ribbed structure 64. The exterior panel 12 can include an exterior panel outermost surface 21 and an exterior panel engine facing surface 23, The exterior panel 12 can extend in an x direction as illustrated by the x, y, z coordinate system in FIG. 6. The fender skin 11 can be located adjacent to a portion of the exterior panel engine facing surface 23 at a junction surface 56. The fender skin 11 can include a fender skin outermost surface 25 and a fender skin engine facing surface 27. A portion of the fender skin 11 can extend in the x direction, a portion of the fender skin 11 can extend in they direction, and a portion of the fender skin 11 can extend in the z direction. The reinforcing member 13 can attach to and extend along a portion of an exterior panel engine facing surface 23 and along a portion of a fender skin engine facing surface 27. The reinforcing member 13 can include a ridge 14 and a flange 35 extending along the reinforcing structure in the y direction forming a corrugation 37.

A ribbed structure 64 adjacent to the exterior panel 12 and the fender skin 11 can include a base 66 and ribs 68 protruding outwardly away from the exterior panel engine facing surface 23 or the fender skin engine facing surface 27. The ribs 68 can extend transversely in the y direction and longitudinally in the x direction across a portion of the exterior panel 12 and/or the fender skin 11. The ribs 68 can extend vertically in the z direction across a portion of the fender skin also. The reinforcing member 13 can include a ribbed structure 32 wherein the ribbed structure 32 can extend transversely and/or longitudinally, and/or diagonally across a portion of the exterior panel engine facing surface 23 and/or a portion of the fender skin engine facing surface 27, The reinforcing member 13 can include a connecting ridge 22. The connecting ridge 22 can extend transversely across the reinforcing member 13. The connecting ridge 22 can be configured to accept the junction surface 56 of the exterior panel 12 and the fender skin 11. A channel 24 can be formed in an air cavity located between the ridges 14 on the reinforcing member 13 and the exterior panel engine facing surface 23 and the fender skin engine facing surface 27. The channel 24 can provide thermal insulation to the exterior panel 12 and to the fender skin 11.

The exterior panel 12, the fender skin 11, or the reinforcing structure can each, independently, comprise polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyolefins, polypropylene, or a combination comprising at least one of the foregoing. The polymeric material can include fiber reinforcement selected from glass, carbon, or a combination comprising at least one of the foregoing.

The exterior panel 12 can extend transversely across the vehicle hood 88, while the fender skin 11 can be located on either end portion 90, 92 of the vehicle hood 88. The polymeric engine hood 104 assembly can open toward an operator with the polymeric engine hood assembly 104 opening away from a vehicle's windshield. Headlamp openings 15 and grill opening 17 can be located on a portion of the polymeric engine hood assembly 104 opposite the opening portion 94 of the vehicle hood 88.

The polymeric engine hood assembly 104 can have a Class A surface finish on the exterior panel outermost surface 21. The polymeric engine hood assembly 104 can have a Class A surface finish on the fender skin outermost surface 25.

Figure 7:
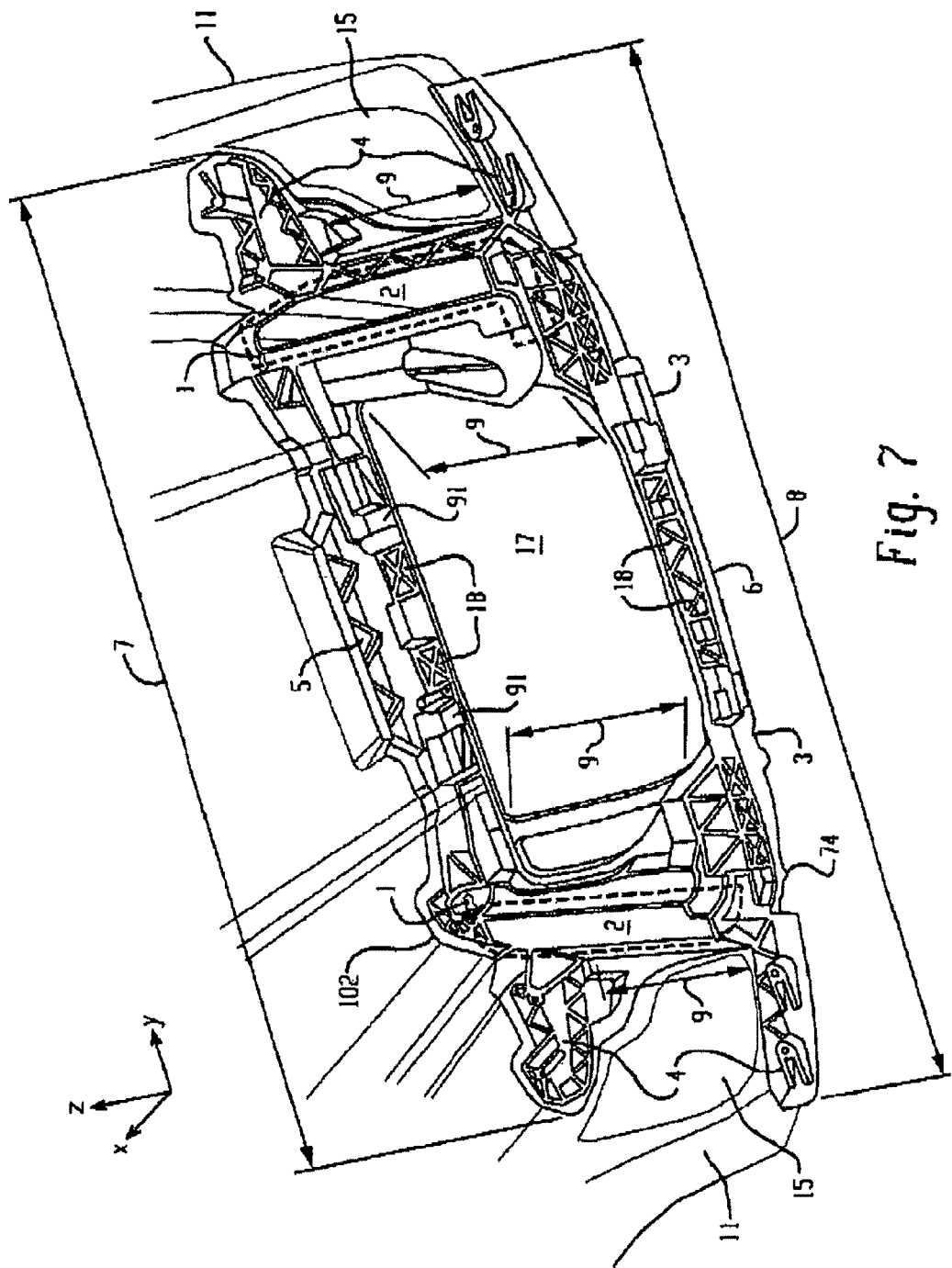
FIG. 7 is an engine facing view of a front end module.
Figure 8:
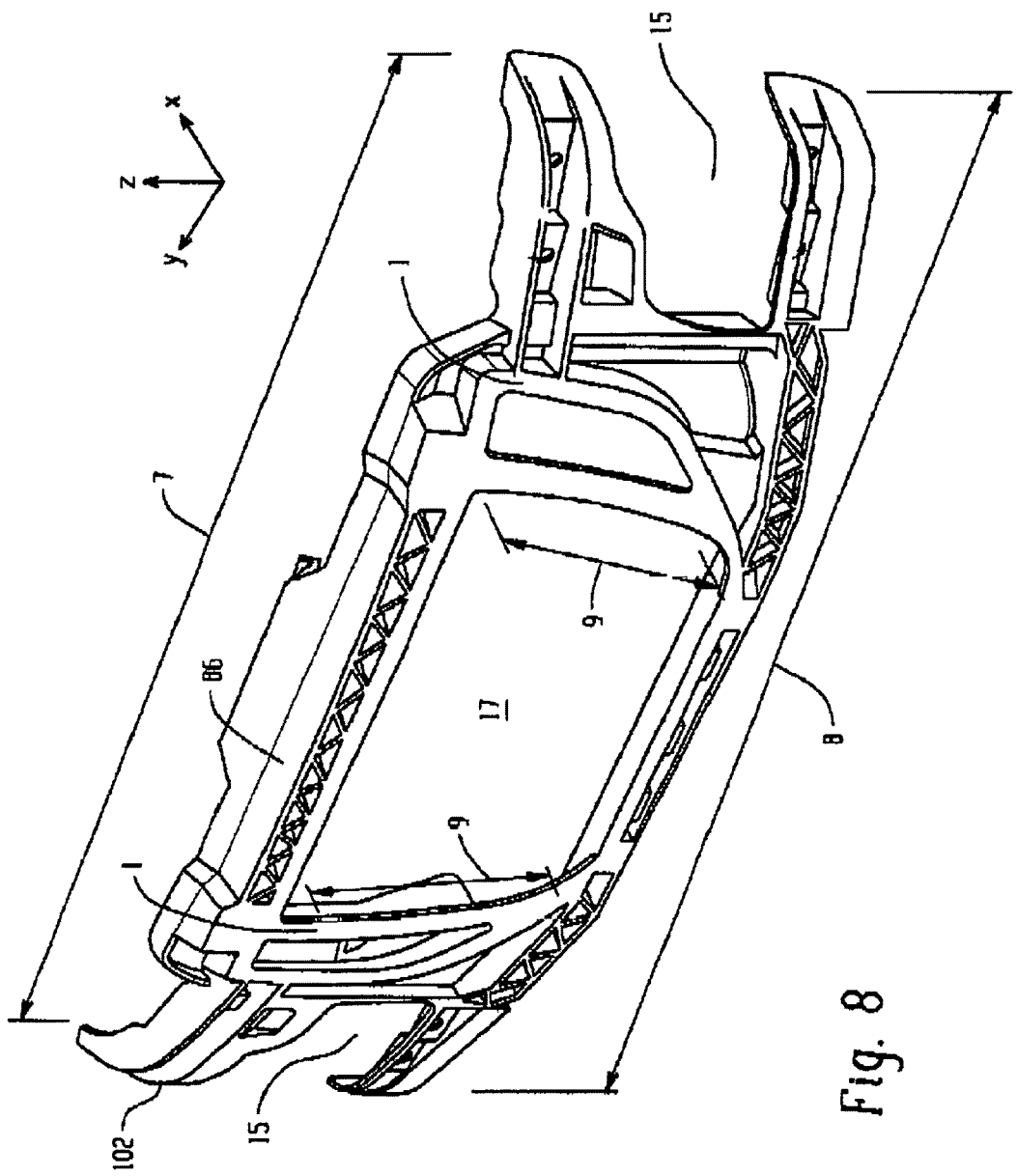
FIG. 8 is a front view of the front end module of FIG. 7.
Figure 9:
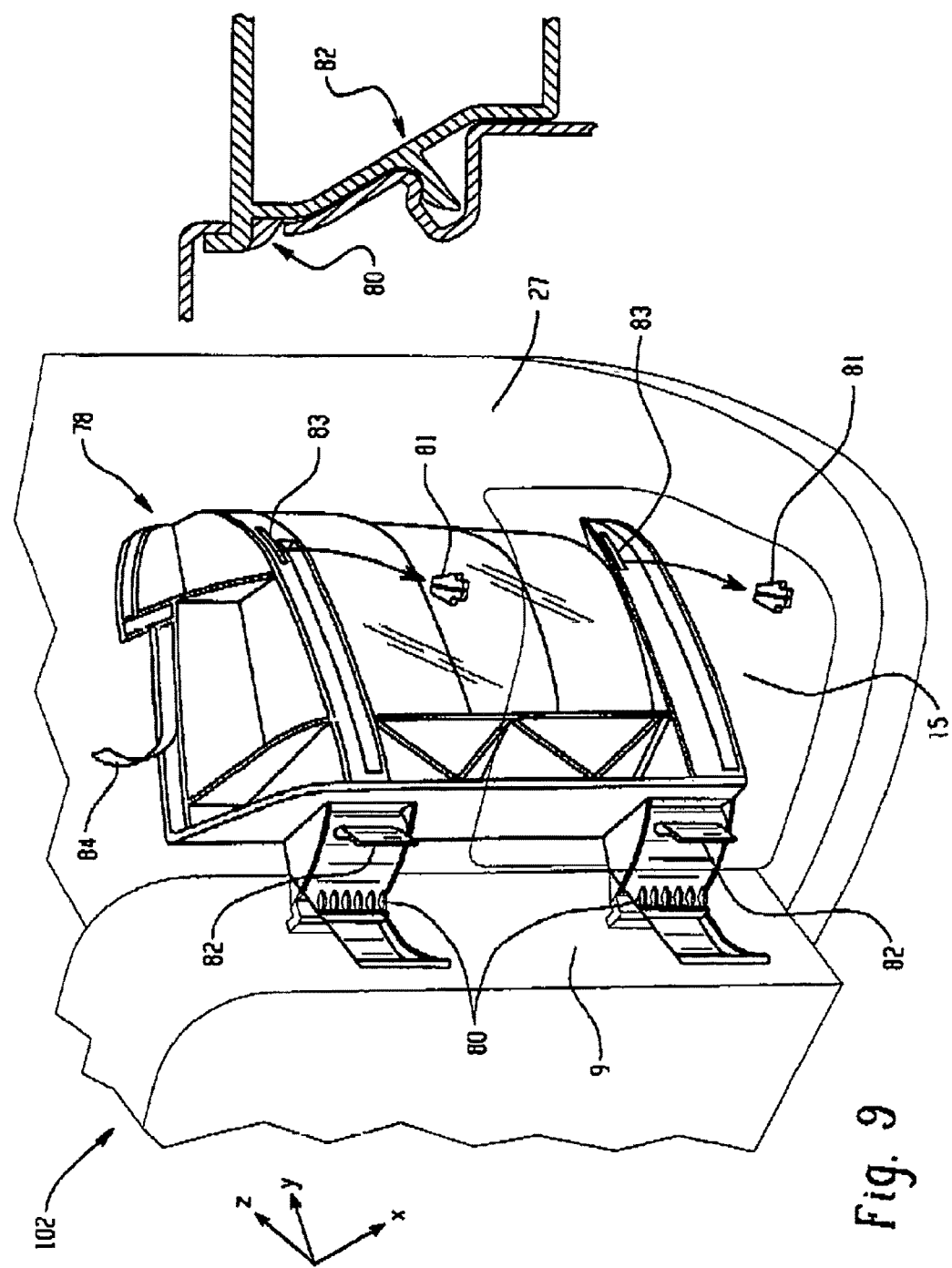
FIG. 9 is a front view of a light support unit.

Turning now to FIGS. 7, 8, and 9, a front end module, 102 for use in a vehicle is illustrated. In FIG. 7, the front end module 102 can include an injection molded base (e.g., a polymeric base) 6. The injection molded base 6 can extend from a left fender skin 11 to a right fender skin 11. The injection molded base 6 can include an upper beam 7, a lower beam 8, and two middle beams 9. The upper beam 7 and the lower beam 8 can be connected by middle beams 9 that are disposed therebetween. Headlamp openings 15 can be formed between the beams 7, 8, 9. A grill opening 17 can be formed between the beams 7, 8, 9. The injection molded base 6 can include an air channel 2 located in the middle beams 9. The injection molded base 6 can include a headlamp support structure 4 located in the headlamp opening 15 and a support structure 91 located above the grill opening 17. The injection molded base 6 can include an integrated hinge 3 in the lower beam 8. The injection molded base 6 can include a grab handle reinforcement structure 5 located on the upper beam 7. As illustrated in FIG. 7, the front end module 102 can include a ribbed base 74. The ribbed base 74 can include ribs 18 dispersed along a portion of at least one of the upper beam 7, the lower beam 8, and the middle beam 9. In FIG. 8, a front end module 102 for use in a vehicle is illustrated. Rib-reinforced. C-type cross-sections facilitate optimal bending stiffness in vertical and horizontal direction eventually in combination with torsional stiffness. A lift-assist connection 1 can be disposed in any position, for example, in corner top portions of the middle beams of the injection molded base.

FIG. 9 illustrates an optional light support unit 78 (e.g., a moveable light support unit) that can be disposed in the headlamp opening 15 and can extend from the front end module 102. The light support unit 78 can include a hinge connection 80 and a snap fit connection 82. The hinge connection 80 and snap fit connection 82 can be configured to attach to the middle beams 9. The light support unit 78 can move away from the middle beams 9 and toward the grill opening 17 (see e.g., FIG. 7) during a collision or impact. The light support unit can also comprise indentations 83 located in a base section of the light support unit 78. The indentations 83 can be configured to mate with hooks 81 extending from the fender skin engine facing surface 27 to hold the light support unit 78 in a stationary position. Bonding agent 84 can be present on light support unit 78 to assist in the light support unit 78 remaining in its functioning position.

A vehicle can include the polymeric engine hood assemblies as described 100, 101, 103, 104, 105. The polymeric engine hood assemblies disclosed herein 100, 101, 103, 104, 105 can include the front end module 102, with or without the optional separate light support unit 78 as described. A vehicle can include the polymeric engine hood assemblies disclosed herein 100, 101, 103, 104, 105 and the front end module 102, with or without the optional separate light support until 78 as described.

The front end module 102 can have a 5 to 45% weight reduction as compared to a front end module made from thermoset for fiberglass reinforced plastic materials, for example, a 10 to 30% weight reduction, for example a 15 to 25% weight reduction.

The polymeric engine hood assembly, vehicle front end module, and methods of making disclosed herein include at least the following embodiments:

Embodiment 1

A polymeric engine hood assembly for use in a vehicle, comprising: an exterior panel having an exterior panel engine facing surface and an exterior panel outermost surface, wherein the exterior panel extends in an x direction; a fender skin adjacent to a portion of the exterior panel engine facing surface at a junction surface, wherein the fender skin has a fender skin engine facing surface and a fender skin outermost surface, wherein a portion of the fender skin extends in the x direction and wherein a portion of the fender skin extends in a y direction; and a reinforcing structure including a body comprising a reinforcing structure first surface and a reinforcing structure second surface, wherein the reinforcing structure includes alternating ridges and flanges extending along the reinforcing structure in the y direction forming corrugations or wherein the corrugations extend at least partially transversely across the body of the reinforcing structure, or a reinforcing member including a body comprising a reinforcing member first surface and a reinforcing member second surface, wherein the reinforcing member includes alternating ridges and grooves extending across the reinforcing member in the y direction forming corrugations, wherein the corrugations extend at least partially longitudinally along the body of the reinforcing member; wherein indentations are disposed in the corrugation flanges on the reinforcing structure and wherein the reinforcing structure is adjacent to and extends along a portion of an exterior panel engine facing surface and along a portion of a fender skin engine facing surface; wherein the reinforcing structure includes a connecting ridge extending transversely across the reinforcing structure located between indentations, wherein the connecting ridge is configured to accept the junction surface of the exterior panel and the fender skin; wherein channels are formed in air cavities located between the ridges on the reinforcing structure and the engine facing surfaces of the exterior panel and the fender skin.

Embodiment 2

A polymeric engine hood assembly for use in a vehicle, comprising: an exterior panel having an exterior panel engine facing surface and an exterior panel outermost surface, wherein a portion of the exterior panel extends in an x direction and a portion of the exterior panel extends in a y direction; a fender skin attached to a portion of the exterior panel engine facing surface at a junction surface, wherein the fender skin has a fender skin engine facing surface and a fender skin outermost surface, wherein a portion of the fender skin extends in the y direction; and a reinforcing structure including a body comprising a reinforcing structure first surface and a reinforcing structure second surface, wherein the reinforcing structure includes alternating ridges and flanges extending across the reinforcing structure in the y direction forming corrugations, wherein the corrugations extend at least partially longitudinally along the body of the reinforcing structure; wherein indentations are disposed in corrugation flanges on the reinforcing structure and wherein the reinforcing structure is adjacent to and extends along a portion of an exterior panel engine facing surface and along a portion of an fender skin engine facing surface; wherein the reinforcing structure includes a connecting ridge extending transversely across the reinforcing structure located between indentations, wherein the connecting ridge is configured to accept the junction surface of the exterior panel and the fender skin; wherein channels are formed in air cavities located between the ridges on the reinforcing structure and the engine facing surfaces of the exterior panel and the fender skin:

Embodiment 3

The polymeric engine hood assembly of Embodiment 1 or Embodiment 2, wherein the channels provide thermal insulation to the exterior panel and to the fender skin and wherein the reinforcing structure or reinforcing member comprises a material able to withstand high temperatures to provide thermal shielding.

Embodiment 4

The polymeric engine hood assembly of any of Embodiments 1-3, wherein the corrugations extend transversely in the y direction, wherein the indentations extend longitudinally in the x direction across the corrugations, or wherein the indentations extend transversely in the y direction and wherein the indentations extend longitudinally in the x direction.

Embodiment 5

The polymeric engine hood assembly of Embodiment 4, wherein the corrugations reinforce the assembly.

Embodiment 6

The polymeric engine hood assembly of any of Embodiments 1-5, wherein the exterior panel and the fender skin are formed by injection molding, co-injection, or thermoforming.

Embodiment 7

The polymeric engine hood assembly of any of Embodiments 1-6, wherein the reinforcing structure is formed by thermoforming.

Embodiment 8

The polymeric engine hood assembly of any of Embodiments 1-7, wherein the reinforcing member is formed by injection molding.

Embodiment 9

The polymeric engine hood assembly of any of Embodiments 1-8, wherein the exterior panel and the reinforcing structure are formed by twin-sheet thermoforming.

Embodiment 10

The polymeric engine hood assembly of any of Embodiments 1-9, wherein the exterior panel, the fender skin, or the reinforcing structure or reinforcing member comprise a polymeric material selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyolefins, polypropylene, or a combination comprising at least one of the foregoing.

Embodiment 11

The polymeric engine hood assembly of any of Embodiments 1-10, wherein the polymeric material includes filler or fiber reinforcement selected from glass, carbon, talc, mica, or a combination comprising at least one of the foregoing.

Embodiment 12

The polymeric engine hood assembly of any of Embodiments 1-11, wherein the exterior panel includes a ridge protruding toward the reinforcing structure first surface and configured to correspondingly mate with a complimentary ridge on the reinforcing structure, forming a handle.

Embodiment 13

The polymeric engine hood assembly of any of Embodiments 1-12, wherein the reinforcing structure includes a metal insert at a fixation location on the reinforcing structure.

Embodiment 14

A method of making a polymeric engine hood assembly for use in a vehicle, comprising: applying heat to a first polymeric sheet; applying heat to a second polymeric sheet; stacking the first polymeric sheet and the second polymeric sheet; placing the stacked sheets between a first mold half and a second mold half; closing the first mold half and the second mold half; applying vacuum to the space between the first polymeric sheet and the first mold half and between the second polymeric sheet and the second mold half, wherein the first polymeric sheet forms an exterior panel and wherein the second polymeric sheet forms a reinforcing structure including a body comprising a reinforcing structure first surface and a reinforcing structure second surface, wherein the reinforcing structure includes alternating ridges and flanges extending across the reinforcing structure in the y direction forming corrugations, wherein the corrugations extend at least partially transversely across the body of the reinforcing structure, wherein indentations are disposed in the corrugations on the reinforcing structure; and attaching the exterior panel to a fender skin at a junction surface, wherein the reinforcing structure includes a connecting ridge extending transversely across the reinforcing structure located between indentations, wherein the connecting ridge is configured to accept the junction surface of the exterior panel and the fender skin, wherein the reinforcing structure is adjacent to and extends along a portion of an exterior panel engine facing surface and along a portion of a fender skin engine facing surface.

Embodiment 15

A polymeric engine hood assembly for use in a vehicle, comprising: an exterior panel having an exterior panel engine facing surface and an exterior panel outermost surface, wherein the exterior panel extends in an x direction; a fender skin adjacent to a portion of the exterior panel engine facing surface at a junction surface, wherein the fender skin has a fender skin engine facing surface and a fender skin outermost surface, wherein a portion of the fender skin extends in the x direction and wherein a portion of the fender skin extends in a y direction; and a reinforcing structure including a body comprising a reinforcing structure first surface and a reinforcing structure second surface, wherein the reinforcing structure attaches to and extends along a portion of an exterior panel engine facing surface and along a portion of a fender skin engine facing surface, wherein the reinforcing structure includes a ridge and flange extending transversely in the y direction forming a corrugation; wherein ribs are disposed laterally across a portion of the exterior panel engine facing surface and wherein ribs are disposed longitudinally across a portion of the fender skin engine facing surface; wherein the reinforcing structure includes a connecting ridge extending transversely across the reinforcing structure located between ribs, wherein the connecting ridge is configured to accept the junction surface of the exterior panel and the fender skin; wherein a channel is formed in air cavities located between the ridge on the reinforcing structure and the engine facing surfaces of the exterior panel or the fender skin.

Embodiment 16

The polymeric engine hood assembly of Embodiment 15, wherein the polymeric engine hood assembly has a Class A surface finish on an exterior panel outermost surface and a fender skin outermost surface.

Embodiment 17

The polymeric engine hood assembly of Embodiment 15 or Embodiment 16, wherein the ribs are formed by an injection molding process selected from gas-assisted injection molding or co-injection molding.

Embodiment 18

The polymeric engine hood assembly of any of Embodiments 14-17, wherein the ribs have a reduced thickness at a portion of the rib disposed adjacent to the interior surface of the exterior panel or reinforcing structure.

Embodiment 19

A polymeric engine hood assembly for use in a vehicle, comprising: an exterior panel having an exterior panel engine facing surface and an exterior panel outermost surface, wherein the exterior panel extends in an x direction; a fender skin adjacent to a portion of the exterior panel engine facing surface at a junction surface, wherein the fender skin has a fender skin engine facing surface and a fender skin outermost surface, wherein a portion of the fender skin extends in the x direction and wherein a portion of the fender skin extends in a y direction; a reinforcing structure including a body comprising a reinforcing structure first surface and a reinforcing structure second surface, wherein the reinforcing structure attaches to and extends along a portion of an exterior panel engine facing surface and along a portion of a fender skin engine facing surface, wherein the reinforcing structure includes a ridge and flange extending transversely in the y direction, forming a corrugation; and a ribbed structure adjacent to the exterior panel and/or the fender skin, wherein the ribbed structure includes a base and ribs protruding outwardly away from the exterior panel engine facing surface or fender skin, wherein the ribs extend longitudinally in the x direction and transversely in the y direction along a portion of the exterior panel and/or the fender skin; wherein the reinforcing structure includes a connecting ridge extending transversely across the reinforcing structure, wherein the connecting ridge is configured to accept the junction surface of the exterior panel and the fender skin; wherein a channel is formed in air cavities located between the ridge on the reinforcing structure and the engine facing surfaces of the exterior panel or the fender skin.

Embodiment 20

The polymeric engine hood assembly of Embodiment 19, wherein the reinforcing structure includes ribs extending transversely, and/or longitudinally, and/or diagonally across a portion of the exterior panel engine facing surface.

Embodiment 21

The polymeric engine hood assembly of Embodiment 19 or Embodiment 20, wherein the polymeric engine hood assembly has a Class A surface face on an exterior panel outermost surface and a fender skin outermost surface.

Embodiment 22

The polymeric engine hood assembly of any of Embodiments 14-21, wherein the exterior panel, the fender skin, or the reinforcing structure comprises a polymeric material selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyolefins, polypropylene, or a combination comprising at least one of the foregoing.

Embodiment 23

The polymeric engine hood assembly of any of Embodiments 14-22, wherein the polymeric material includes fiber reinforcement selected from glass, carbon, talc, mica, or a combination comprising at least one of the foregoing.

Embodiment 24

A vehicle, comprising: a structural body; and the polymeric engine hood assembly of any of Embodiments 1-24.

Embodiment 25

A front end module for a vehicle, comprising: an injection molded polymeric base extending from a left fender skin to a right fender skin, wherein the injection molded base comprises an upper beam and a lower beam connected by two middle beams disposed therebetween, wherein headlamp and grill openings are formed between the upper and lower beams; a lift assist connection disposed in corner top portions of the middle beams of the injection molded base; air channels located in the middle beams; headlamp support structures and a grill opening reinforcement located in the openings; hinges integrated in the lower beam; and a grab handle reinforcement structure located on the upper beam; wherein the front end module comprises a hollow base or a ribbed base.

Embodiment 26

The front end module of Embodiment 25, wherein the integrated hinges increase overall stiffness of the front end module.

Embodiment 27

The front end module of Embodiment 25 or Embodiment 26, wherein the front end module has a 10 to 30% weight reduction as compared to a front end module made from thermoset or fiberglass reinforced plastic materials.

Embodiment 28

The front end module of any of Embodiments 25-27, wherein the ribbed base includes ribs dispersed along portions of at least one of the upper beam, lower beam, and middle beams.

Embodiment 29

The front end module of any of Embodiments 25-28, wherein the front end module comprises a polymeric material selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyolefins, polypropylene, or a combination comprising at least one of the foregoing.

Embodiment 30

The front end module of any of Embodiments 25-29, wherein the front end module further comprises a, moveable light support, unit disposed in and extending from the headlamp openings.

Embodiment 31

The front end module of any of Embodiments 25-30, wherein the light support unit comprises a hinge connection and snap fit connection configured to attach to the middle beam, wherein the light support unit moves away from the middle beam and toward the grill opening during a collision.

Embodiment 32

The front end module of Embodiment 30, wherein the light support unit further comprises indentations located in a base section of the light support unit, wherein the indentations are configured to mate with hooks extending from the fender skin to hold the light support unit in a stationary position.

Embodiment 33

A polymeric engine hood assembly, comprising: the polymeric engine hood assembly of any of Embodiments 1-23; and the front end module of any of Embodiments 24-31.

Embodiment 34

A vehicle, comprising: a structural component; the polymeric engine hood assembly of any of Embodiments 1-23; and the front end module of any of Embodiments 25-32.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless otherwise specified herein, any reference to standards, regulations, testing methods and the like, such as ASTM D256, ASTM D638, ASTM D790, ASTM D1238, ASTM D 4812, ASTM 4935, and UL94 refer to the standard, regulation, guidance or method that is in force at the time of filing of the present application.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:
1. A polymeric engine hood assembly for use in a vehicle, comprising:
an exterior panel having an exterior panel engine facing surface and an exterior panel outermost surface, wherein the exterior panel extends in an x direction;
a fender skin adjacent to a portion of the exterior panel engine facing surface at a junction surface, wherein the fender skin has a fender skin engine facing surface and a fender skin outermost surface, wherein a portion of the fender skin extends in the x direction and wherein a portion of the fender skin extends in a y direction; and
a reinforcing structure including a body comprising a reinforcing structure first surface and a reinforcing structure second surface, wherein the reinforcing structure includes alternating ridges and flanges extending along the reinforcing structure in the y direction forming corrugations, wherein the corrugations extend at least partially transversely across the body of the reinforcing structure;
wherein indentations are disposed in the corrugation flanges on the reinforcing structure and wherein the reinforcing structure is adjacent to and extends along a portion of an exterior panel engine facing surface and along a portion of a fender skin engine facing surface;
wherein the reinforcing structure includes a connecting ridge extending transversely across the reinforcing structure located between indentations, wherein the connecting ridge is configured to accept the junction surface of the exterior panel and the fender skin;
wherein channels are formed in air cavities located between the ridges on the reinforcing structure and the engine facing surfaces of the exterior panel and the fender skin.

2. The polymeric engine hood assembly of claim 1, wherein the channels provide thermal insulation to the exterior panel and to the fender skin and wherein the reinforcing structure or reinforcing member comprises a material able to withstand high temperatures to provide thermal shielding.

3. The polymeric engine hood assembly of claim 1, wherein the corrugations extend transversely in the y direction, wherein the indentations extend longitudinally in the x direction across the corrugations, or wherein the indentations extend transversely in the y direction and wherein the indentations extend longitudinally in the x direction.

4. The polymeric engine hood assembly of claim 3, wherein the corrugations reinforce the assembly.

5. The polymeric engine hood assembly of claim 1, wherein the exterior panel and the fender skin is formed by injection molding, co-injection, or thermoforming.

6. The polymeric engine hood assembly of claim 1, wherein the reinforcing structure is formed by thermoforming.

7. The polymeric engine hood assembly of claim 1, wherein the reinforcing member is formed by injection molding.

8. The polymeric engine hood assembly of claim 1, wherein the exterior panel, the fender skin, the reinforcing structure, or the reinforcing member comprise a polymeric material selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyolefins, polypropylene, or a combination comprising at least one of the foregoing and, wherein the polymeric material includes filler or fiber reinforcement selected from glass, carbon, talc, mica, or a combination comprising at least one of the foregoing.

9. The polymeric engine hood assembly of claim 1, wherein the exterior panel includes a ridge protruding toward the reinforcing structure first surface and configured to correspondingly mate with a complimentary ridge on the reinforcing structure, forming a handle.

10. The polymeric engine hood assembly of claim 1, wherein the reinforcing structure or the reinforcing member includes a metal insert at a fixation location on the reinforcing structure or the reinforcing member.

11. A method of making a polymeric engine hood assembly for use in a vehicle, comprising:
applying heat to a first polymeric sheet;
applying heat to a second polymeric sheet;
stacking the first polymeric sheet and the second polymeric sheet
placing the stacked sheets between a first mold half and a second mold half;
closing the first mold half and second mold half;
applying vacuum to the space between the first polymeric sheet and the first mold half and between the second polymeric sheet and the second mold half, wherein the first polymeric sheet forms an exterior panel and wherein the second polymeric sheet forms a reinforcing structure including a body comprising a reinforcing structure first surface and a reinforcing structure second surface, wherein the reinforcing structure includes alternating ridges and flanges extending across the reinforcing structure in the y direction forming corrugations, wherein the corrugations extend at least partially transversely across the body of the reinforcing structure, wherein indentations are disposed in the corrugations on the reinforcing structure; and
attaching the exterior panel to a fender skin at a junction surface, wherein the reinforcing structure includes a connecting ridge extending transversely across the reinforcing structure located between indentations, wherein the connecting ridge is configured to accept the junction surface of the exterior panel and the fender skin, wherein the reinforcing structure is adjacent to and extends along a portion of an exterior panel engine facing surface and along a portion of a fender skin engine facing surface.

12. A polymeric engine hood assembly for use in a vehicle, comprising:
an exterior panel having an exterior panel engine facing surface and an exterior panel outermost surface, wherein the exterior panel extends in an x direction;
a fender skin adjacent to a portion of the exterior panel engine facing surface at a junction surface, wherein the fender skin has a fender skin engine facing surface and a fender skin outermost surface, wherein a portion of the fender skin extends in the x direction and wherein a portion of the fender skin extends in a y direction; and
a reinforcing structure including a body comprising a reinforcing structure first surface and a reinforcing structure second surface, wherein the reinforcing structure attaches to and extends along a portion of an exterior panel engine facing surface and along a portion of a fender skin engine facing surface, wherein the reinforcing structure includes a ridge and groove extending transversely in the y direction forming a corrugation;
wherein ribs are disposed laterally across a portion of the exterior panel engine facing surface and wherein ribs are disposed longitudinally across a portion of the fender skin engine facing surface;
wherein the reinforcing structure includes a connecting ridge extending transversely across the reinforcing structure located between ribs, wherein the connecting ridge is configured to accept the junction surface of the exterior panel and the fender skin;
wherein a channel is formed in air cavities located between the ridge on the reinforcing structure and the engine facing surfaces of the exterior panel or the fender skin.

13. A vehicle, comprising:
a structural body; and
the polymeric engine hood assembly of claim 1.

14. A front end module for a vehicle, comprising:
the polymeric engine hood assembly of claim 1;
an injection molded polymeric base extending from a left fender skin to a right fender skin, wherein the injection molded base comprises
an upper beam and a lower beam connected by two middle beams disposed therebetween, wherein headlamp and grill openings are formed between the upper and lower beams;
a lift assist connection disposed in corner top portions of the middle beams of the injection molded base;
air channels located in the middle beams;
headlamp support structures and a grill opening reinforcement located in the openings;
hinges integrated in the lower beam; and
a grab handle reinforcement structure located on the upper beam;
wherein the front end module comprises a hollow base or a ribbed base.

15. The front end module of claim 14, wherein the ribbed base includes ribs dispersed along portions of at least one of the upper beam, lower beam, and middle beams.

16. The front end module of claim 14, wherein the front end module comprises a polymeric material selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyolefins, polypropylene, or a combination comprising at least one of the foregoing.

17. The front end module of claim 16, wherein the polymeric material includes filler or fiber reinforcement selected from glass, carbon, talc, mica, or a combination comprising at least one of the foregoing.

18. The front end module of claim 14, wherein the front end module further comprises a moveable light support unit disposed in and extending from the headlamp openings.

19. A polymeric engine hood assembly, comprising:
the polymeric engine hood assembly of claim 1; and
a front end module, comprising an injection molded polymeric base extending from a left fender skin to a right fender skin, wherein the injection molded base comprises
an upper beam and a lower beam connected by two middle beams disposed therebetween, wherein headlamp and grill openings are formed between the upper and lower beams;
a lift assist connection disposed in corner top portions of the middle beams of the injection molded base;
air channels located in the middle beams;
headlamp support structures and a grill opening reinforcement located in the openings;
hinges integrated in the lower beam; and a grab handle reinforcement structure located on the upper beam;

wherein the front end module comprises a hollow base or a ribbed base.

20. A vehicle, comprising:
a structural component;
the polymeric engine hood assembly of claim 1; and
a front end module, comprising an injection molded polymeric base extending from a left fender skin to a right fender skin, wherein the injection molded base comprises
   an upper beam and a lower beam connected by two middle beams disposed therebetween, wherein headlamp and grill openings are formed between the upper and lower beams;
   a lift assist connection disposed in corner top portions of the middle beams of the injection molded base;
   air channels located in the middle beams;
   headlamp support structures and a grill opening reinforcement located in the openings;
   hinges integrated in the lower beam; and
   a grab handle reinforcement structure located on the upper beam;
wherein the front end module comprises a hollow base or a ribbed base.

* * * * *